United States Patent
Komazawa et al.

(10) Patent No.: US 11,602,920 B2
(45) Date of Patent: Mar. 14, 2023

(54) LAMINATE

(71) Applicants: DAIKIN INDUSTRIES, LTD., Osaka (JP); DAIKIN AMERICA, INC., Orangeburg, NY (US)

(72) Inventors: Kozue Komazawa, Osaka (JP); Kyle Brundin, Orangeburg, NY (US); Yuuki Kuwajima, Osaka (JP); Yosuke Nishimura, Osaka (JP); Steve Mariconti, Orangeburg, NY (US); Takeshi Inaba, Orangeburg, NY (US)

(73) Assignees: DAIKIN INDUSTRIES, LTD., Osaka (JP); DAIKIN AMERICA, INC., Orangeburg, NY (US)

( * ) Notice: Subject to any disclaimer, the term of this patent is extended or adjusted under 35 U.S.C. 154(b) by 63 days.

(21) Appl. No.: 17/431,015

(22) PCT Filed: Dec. 13, 2019

(86) PCT No.: PCT/IB2019/060744
§ 371 (c)(1),
(2) Date: Aug. 13, 2021

(87) PCT Pub. No.: WO2020/170025
PCT Pub. Date: Aug. 27, 2020

(65) Prior Publication Data
US 2022/0161527 A1     May 26, 2022

Related U.S. Application Data

(60) Provisional application No. 62/809,376, filed on Feb. 22, 2019.

(51) Int. Cl.
*B32B 25/08*     (2006.01)
*B32B 25/18*     (2006.01)
(Continued)

(52) U.S. Cl.
CPC ............... *B32B 25/08* (2013.01); *B32B 1/08* (2013.01); *B32B 25/02* (2013.01); *B32B 25/18* (2013.01);
(Continued)

(58) Field of Classification Search
CPC ............... B32B 1/08; B32B 2250/02; B32B 2264/1021; B32B 2270/00;
(Continued)

(56) References Cited

U.S. PATENT DOCUMENTS 6,680,124 B1    1/2004   Araki et al.
2007/0219333 A1    9/2007   Shimono et al.
(Continued)

FOREIGN PATENT DOCUMENTS

CN     105722680 A    6/2016
JP     53-111719 A    9/1978
(Continued)

OTHER PUBLICATIONS

Tsukasa et al., "Effect of rubber reinforcing agent on aldehyde cross-linking reaction", Industrialization Academic Journal, Chemical Society of Japan, vol. 66, No. 9, pp. 1397-1402, <https://doi.org/10.1246/nikkashi1898.66.9_1397>, Sep. 5, 1963 (6 pages total).
(Continued)

*Primary Examiner* — Yan Lan
(74) *Attorney, Agent, or Firm* — Sughrue Mion, PLLC

(57) ABSTRACT

Adding silica particles having specified collective characteristics to a fluororubber formulation enhances direct adhesion between the fluororubber formulation and a copolymer upon curing. Specifically, as measured before being mixed into the fluororubber formulation, the silica particles have an average value of the product "(particle size)×(circularity)" that is 17.5 nm or higher and 500 μm or lower. The silica particles may also have an average particle size of between (Continued)

25.0 nm inclusive and 500 μm inclusive, and an average circularity of 0.80 or higher. Alternatively, as measured after being incorporated into the fluororubber formulation and then cured, the silica particles have an apparent average value of the product "(particle size)×(circularity)" that is 32.0 nm or higher and 500 μm or lower. The silica particles may also have an apparent average particle size of between 40.0 nm inclusive and 500 μm inclusive as measured after being incorporated into the fluororubber formulation and then cured.

27 Claims, 8 Drawing Sheets

(51) Int. Cl.
*B32B 27/32* (2006.01)
*B32B 25/02* (2006.01)
*B32B 1/08* (2006.01)
*B32B 27/26* (2006.01)
*B32B 27/30* (2006.01)

(52) U.S. Cl.
CPC ............ *B32B 27/26* (2013.01); *B32B 27/304* (2013.01); *B32B 27/322* (2013.01); *B32B 2250/02* (2013.01); *B32B 2264/1021* (2020.08); *B32B 2270/00* (2013.01); *B32B 2307/202* (2013.01); *B32B 2597/00* (2013.01)

(58) Field of Classification Search
CPC .......... B32B 2307/202; B32B 2307/51; B32B 2307/732; B32B 25/02; B32B 25/08; B32B 25/14; B32B 25/18; B32B 2597/00; B32B 2605/08; B32B 27/26; B32B 27/304; B32B 27/322; F16L 11/04; F16L 2011/047

See application file for complete search history.

(56) References Cited

U.S. PATENT DOCUMENTS

| | | |
|---|---|---|
| 2012/0107617 A1 | 5/2012 | Masui et al. |
| 2016/0288461 A1 | 10/2016 | Kuwajima et al. |
| 2019/0344545 A1 | 11/2019 | Osawa et al. |

FOREIGN PATENT DOCUMENTS

| | | | |
|---|---|---|---|
| JP | 62-222147 A | 9/1987 |
| JP | 2003-19772 A | 1/2003 |
| JP | 2004-131543 A | 4/2004 |
| JP | 2011-153075 A | 8/2011 |
| JP | 2015-052740 A | 3/2015 |
| JP | 2015-231717 A | 12/2015 |
| JP | 2018-058289 A | 4/2018 |
| JP | 2018-156026 A | 10/2018 |
| WO | 99/45044 A1 | 9/1999 |
| WO | 2005/100420 A1 | 10/2005 |
| WO | 2011/001756 A1 | 1/2011 |
| WO | 2018/123448 A1 | 7/2018 |

OTHER PUBLICATIONS

Translation of Office Action dated May 10, 2022 from the Japanese Patent Office in corresponding JP Application No. 2021-544940.
International Search Report of PCT/IB2019/060744 dated Mar. 17, 2020 [PCT/ISA/210].
International Preliminary Report on Patentability with translation of Written Opinion dated Aug. 10, 2021, in International Application No. PCT/IB2019/060744.
Extended European Search Report dated Oct. 5, 2022 in corresponding European Application No. 19916196.9.

[FIG. 1]
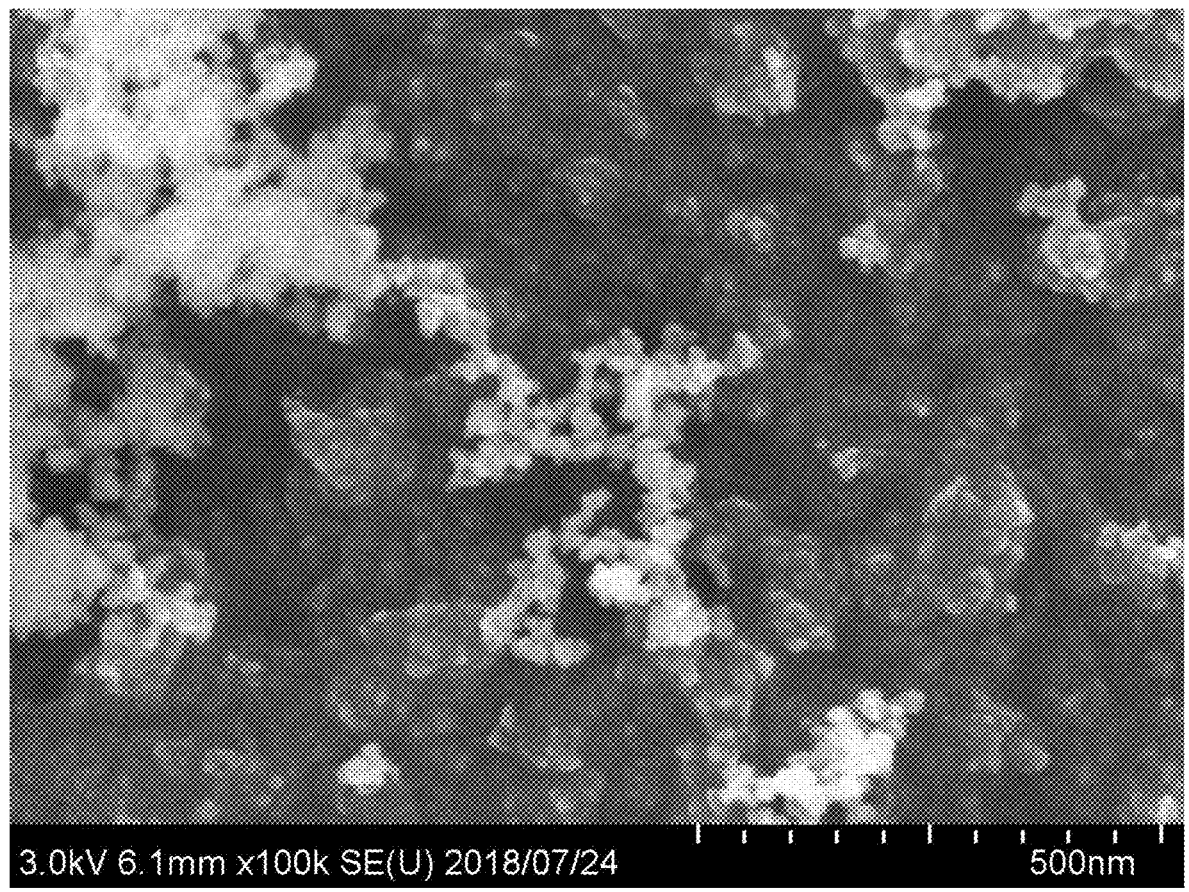

[FIG. 2]
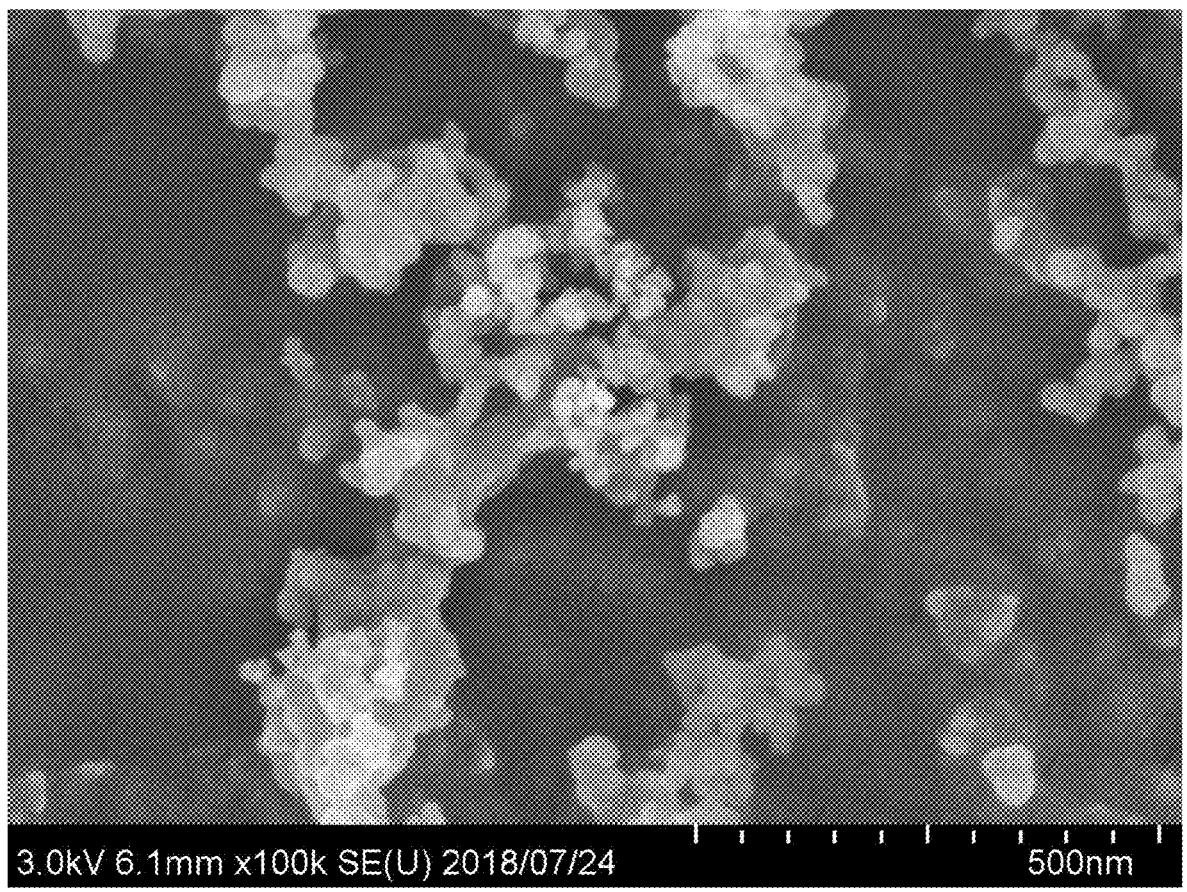

[FIG. 3]
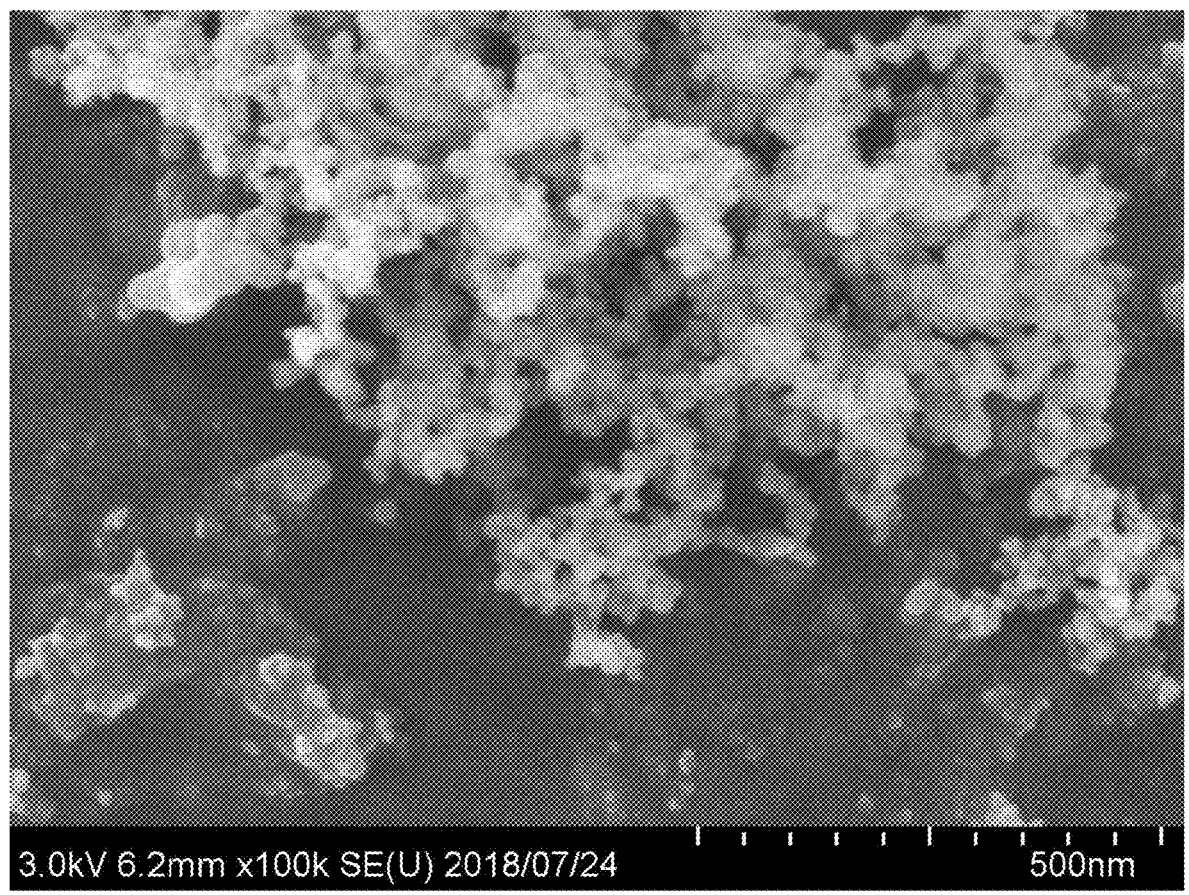

[FIG. 4]
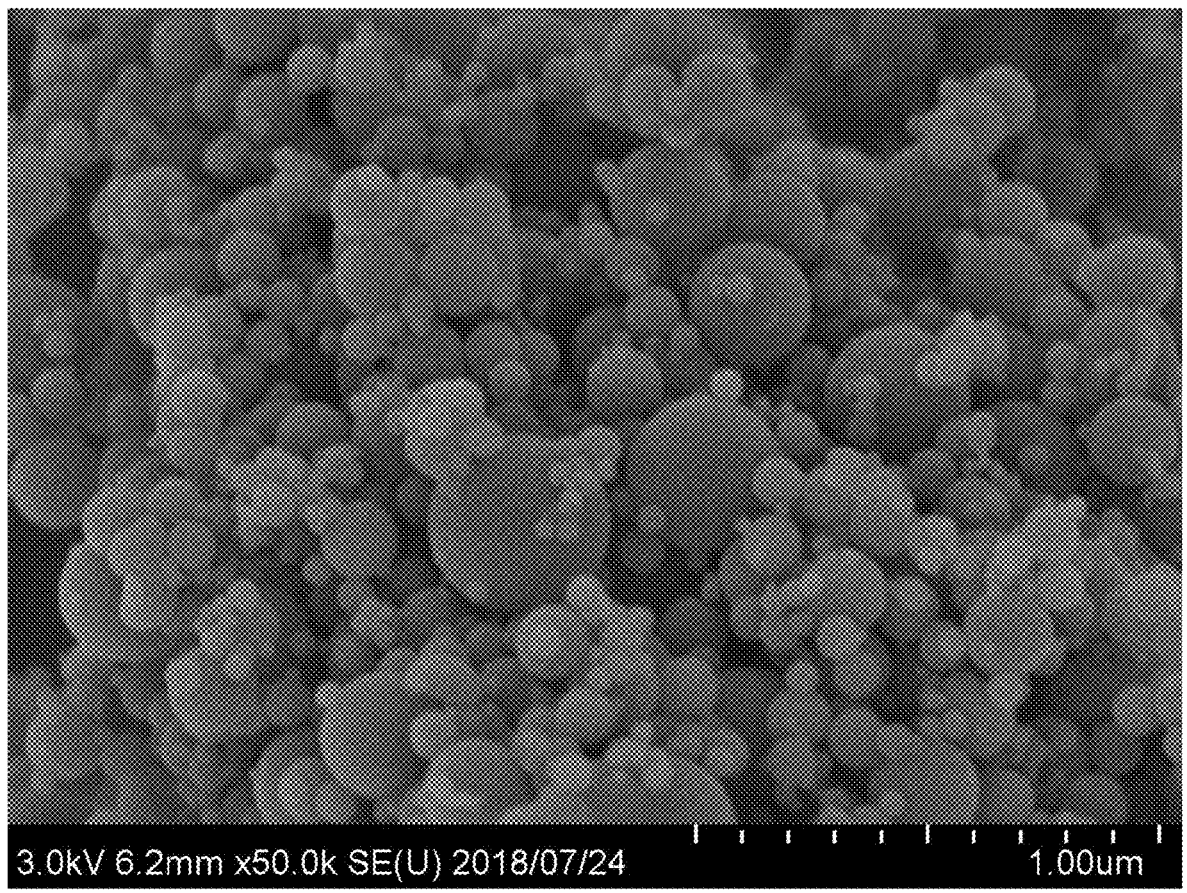

[FIG. 5]
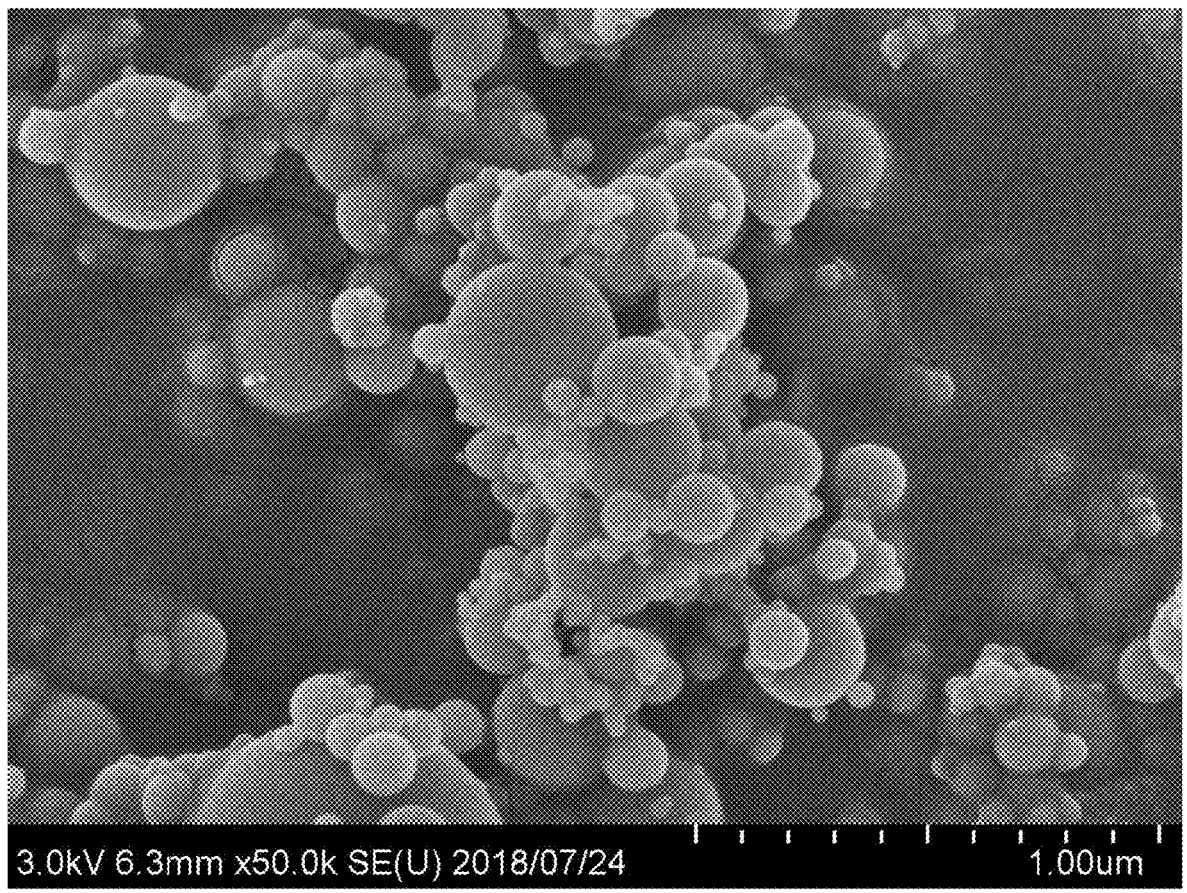

[FIG. 6]
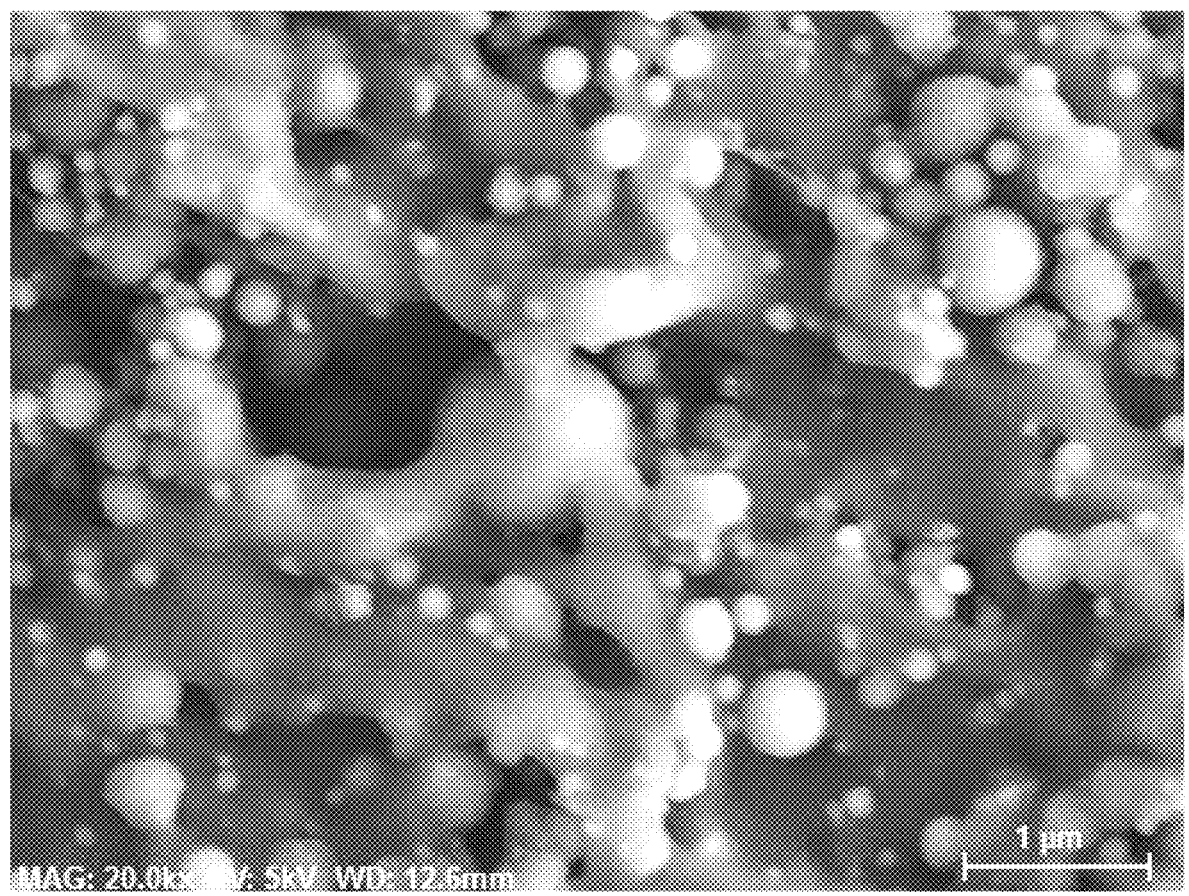

[FIG. 7]
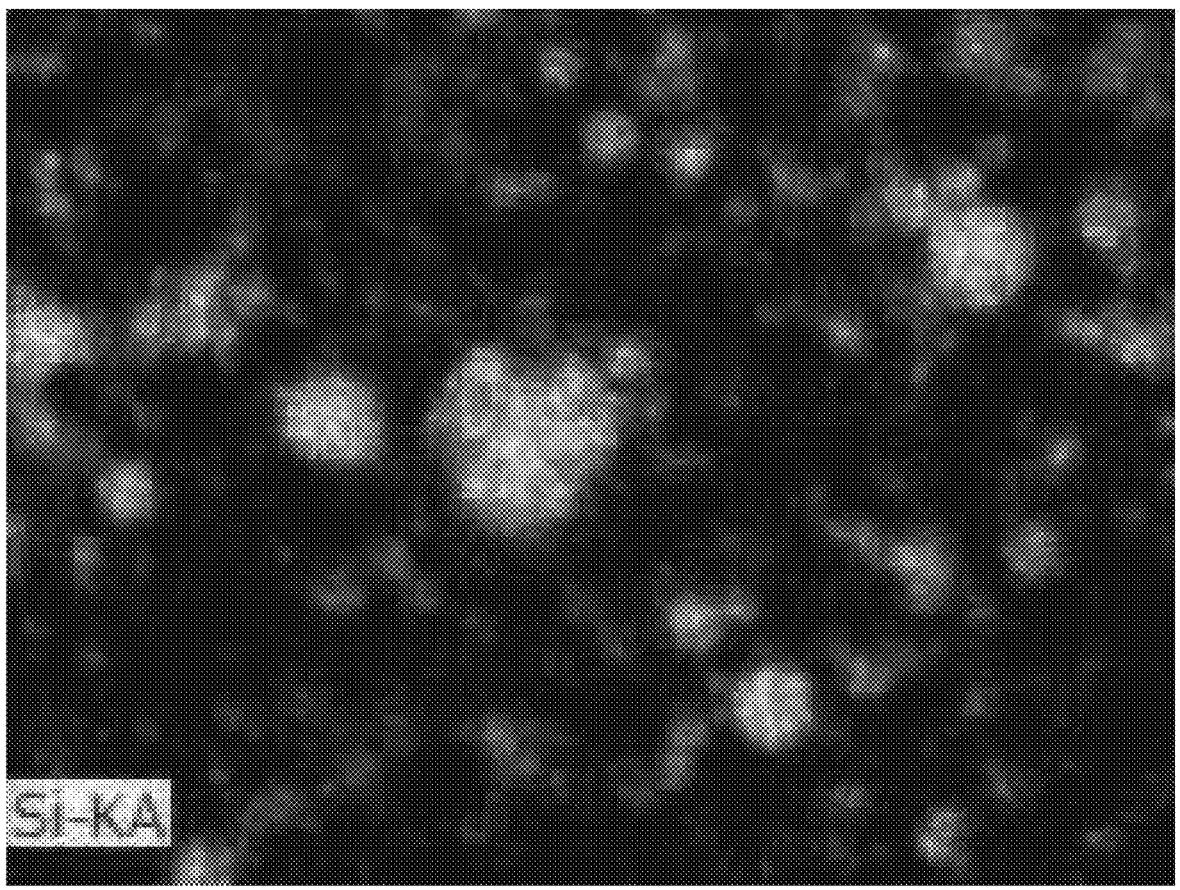

[FIG. 8]
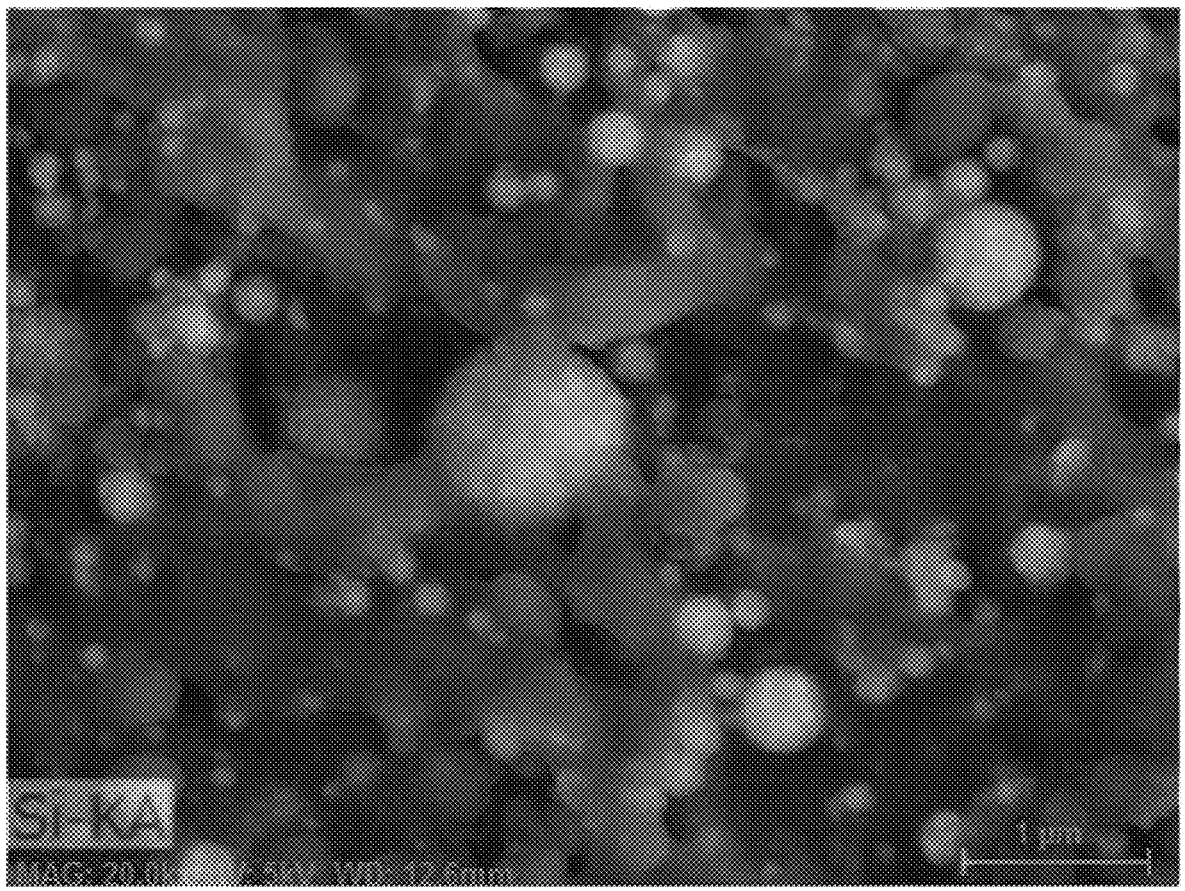

LAMINATE

CROSS REFERENCE TO RELATED APPLICATIONS

This application is a National Stage of International Application No. PCT/IB2019/060744 filed on Dec. 13, 2019, claiming priority based on U.S. Provisional Patent Application No. 62/809,376 filed on Feb. 22, 2019.

TECHNICAL FIELD

The present disclosure relates to a laminate, a tube, a hose, and a pipe for transferring fluid.

BACKGROUND ART

Growing environmental awareness has led to calls for improved control of fuel volatility, especially in the automotive industry. This demand, in turn, has raised the need for materials having excellent fuel-barrier properties.

SUMMARY OF THE INVENTION

Technical Problem

Among common rubber hoses for fuel transfer are laminate hoses, in which rubber is used except for a barrier layer. The barrier layer in these hoses is made of a fluoropolymer for enhancing fuel-permeability resistance. To achieve decreased fuel permeability of the barrier layer, increasing the barrier-layer thickness and using a perhalogen fluoropolymer that has the lowest permeability among fluoropolymers have been considered as ways for ensuring decreased permeability.

However, increasing the thickness of the fluoropolymer barrier layer leads to an increase in hose weight, and is also disadvantageous from the standpoint of energy conservation. In addition, bendability (flexibility) of the hose is lowered, which is disadvantageous in terms of ease of handling the hose (assembling property).

Furthermore, when a perhalogen fluoropolymer is used as a barrier layer, the barrier layer cannot be easily adhered with the rubber of inner and outer layers. This lack of sufficient adhesion requires an additional process such as surface treatment of the fluoropolymer to improve its adhesiveness with rubber or winding a film or a tape around the layer. Such a complicated process significantly lowers productivity, and also greatly increases cost, which become practical disadvantages. Therefore, direct adhesion technology of rubber and fluoropolymer is desired.

For adhering fluorine-free rubber (such as acrylonitrile-butadiene rubber (NBR) and epichlorihydrin rubber (ECO)) and a fluoropolymer that has an ultra-low fuel permeability such as a chlorotrifluoroethylene-tetrafluoroethylene-perfluoro(alkylvinylether) (CTFE/TFE/PAVE) copolymer, direct adhesion technology has already been developed. See, e.g., or equivalently WO 2011/001756 A1, the contents of all of which are hereby incorporated by reference in their entireties. But when NBR is used for the innermost hose layer, an extract derived from a plasticizer and deterioration of the barrier property become problematic. And ECO is not used for the innermost hose layer because of its inferior resistance to fuel oil. In order to solve these problems, it becomes necessary to use fluororubber such as vinylidene fluoride-based rubber (FKM) instead of NBR for the innermost layer. It is difficult, however, to adhere fluororubber such as FKM and a fluoropolymer such as a CTFE/TFE/PAVE copolymer using conventional technology. The present disclosure provides a formulation that enables adhering fluororubber such as FKM and a fluoropolymer such as a CTFE/TFE/PAVE copolymer directly.

Solution to Problem

According to the present invention, there are provided:
(1) A laminate comprising:
a fluororubber layer (A); and
a fluoropolymer layer (B) on the fluororubber layer (A); wherein:
the fluororubber layer (A) is a layer made of a fluororubber composition for curing;
the fluororubber composition for curing comprises an uncured fluororubber, silica particles, and a basic multifunctional compound;
the silica particles have an average value of the product "(particle size)×(circularity)" that is 17.5 nm or higher and 500 μm or lower;
the silica particles are contained in the fluororubber composition for curing in an amount of between 1 part by mass inclusive and 70 parts by mass inclusive for each 100 parts by mass of the uncured fluororubber;
the fluoropolymer layer (B) is a layer made of a fluoropolymer composition; and
the fluoropolymer composition comprises a fluoropolymer that is a chlorotrifluoroethylene copolymer or a tetrafluoroethylene copolymer comprising a tetrafluoroethylene unit and a unit derived from at least one monomer selected from the group consisting of perfluoro(alkylvinylether), vinylidene fluoride and a monomer represented by the general formula: $CX^8X^9=CX^{10}Y$, wherein $X^8$, $X^9$ and $X^{10}$ are independently F or H, Y is —Cl or —Rf$^5$—Br, Rf$^5$ is single bond or a $C_1$-$C_5$ perfluoroalkylene group.
(2) The laminate according to (1), wherein the fluoropolymer is the chlorotrifluoroethylene copolymer or a tetrafluoroethylene copolymer comprising the tetrafluoroethylene unit, a vinylidene fluoride unit and a unit derived from the monomer represented by the general formula: $CX^8X^9=CX^{10}Y$.
(3) The laminate according to any one of (1) and (2), wherein the fluoropolymer is the chlorotrifluoroethylene copolymer.
(4) The laminate according to any one of (1) to (3), wherein the chlorotrifluoroethylene copolymer comprises a chlorotrifluoroethylene unit, a tetrafluoroethylene unit, and a perfluoro(alkylvinylether) unit.
(5) The laminate according to (4), wherein the ratio between the chlorotrifluoroethylene unit and the tetrafluoroethylene unit in the chlorotrifluoroethylene copolymer is chlorotrifluoroethylene unit/tetrafluoroethylene unit=15-90/85-10 in mol %.
(6) The laminate according to any one of (4) and (5), wherein the amount of the perfluoro(alkylvinylether) unit in the chlorotrifluoroethylene copolymer is not smaller than 0.5 mol % and not larger than 5 mol % of all the monomer units.
(7) The laminate according to any one of (1) to (6), wherein the silica particles have an average particle size that is 25.0 nm or higher.
(8) The laminate according to any one of (1) to (7), wherein the silica particles have an average particle size that is 500 μm or lower.

(9) The laminate according to any one of (1) to (8), wherein the silica particles have an average circularity that is 0.80 or higher.
(10) The laminate according to any one of (1) to (9), wherein the fluororubber composition for curing further comprises low molecular weight polytetrafluoroethylene powder.
(11) The laminate according to any one of (1) to (10), wherein the fluororubber composition for curing further comprises a phosphorus compound represented by the general formula $PR_3$, wherein the three Rs may be the same as or different from one another, and each R represents a halogen atom or an organic group.
(12) The laminate according to any one of (1) to (11), wherein the fluororubber composition for curing further comprises a peroxide curing agent.
(13) A laminate obtained by curing the laminate according to any one of (1) to (12), wherein a cured fluororubber layer produced from the fluororubber layer (A) and the fluoropolymer layer (B) are adhered to each other by curing.
(14) A tube or hose for transferring fuel, comprising the laminate according to any one of (1) to (13).
(15) A pipe for transferring fluid, comprising the laminate according to any one of (1) to (13).
(16) A laminate comprising:
  a cured fluororubber layer (A1); and
  a fluoropolymer layer (B) on the cured fluororubber layer (A1);
  wherein:
    the cured fluororubber layer (A1) is a layer made of a cured fluororubber composition;
    the cured fluororubber composition comprises a cured fluororubber, silica particles, and a basic multifunctional compound;
    the silica particles have an apparent average value of the product "(particle size)×(circularity)" that is 32.0 nm or higher and 500 μm or lower;
    the silica particles are contained in the cured fluororubber composition in an amount of between 1 part by mass inclusive and 70 parts by mass inclusive for each 100 parts by mass of the fluororubber;
    the fluoropolymer layer (B) is a layer made of a fluoropolymer composition; and
    the fluoropolymer composition comprises a fluoropolymer that is a chlorotrifluoroethylene copolymer or a tetrafluoroethylene copolymer comprising a tetrafluoroethylene unit and a unit derived from at least one monomer selected from the group consisting of perfluoro(alkylvinylether), vinylidene fluoride and a monomer represented by the general formula: $CX^8X^9=CX^{10}Y$, wherein $X^8$, $X^9$ and $X^{10}$ are independently F or H, Y is —Cl or —$Rf^5$—Br, $Rf^5$ is single bond or a $C_1$-$C_5$ perfluoroalkylene group.
(17) The laminate according to (16), wherein the fluoropolymer is the chlorotrifluoroethylene copolymer or a tetrafluoroethylene copolymer comprising the tetrafluoroethylene unit, a vinylidene fluoride unit and a unit derived from the monomer represented by the general formula: $CX^8X^9=CX^{10}Y$.
(18) The laminate according to any one of (16) and (17), wherein the fluoropolymer is the chlorotrifluoroethylene copolymer.
(19) The laminate according to any one of (16) to (18), wherein the chlorotrifluoroethylene copolymer comprises a chlorotrifluoroethylene unit, a tetrafluoroethylene unit, and a perfluoro(alkylvinylether) unit.
(20) The laminate according to (19), wherein the ratio between the chlorotrifluoroethylene unit and the tetrafluoroethylene unit in the chlorotrifluoroethylene copolymer is chlorotrifluoroethylene unit/tetrafluoroethylene unit=15-90/85-10 in mol %.
(21) The laminate according to any one of (19) and (20), wherein the amount of the perfluoro(alkylvinylether) unit in the chlorotrifluoroethylene copolymer is not smaller than 0.5 mol % and not larger than 5 mol % of all the monomer units.
(22) The laminate according to any one of (16) to (21), wherein the silica particles have an apparent average particle size that is 40.0 nm or higher.
(23) The laminate according to any one of (16) to (22), wherein the silica particles have an apparent average particle size that is 500 μm or lower.
(24) The laminate according to any one of (16) to (23), wherein the cured fluororubber composition further comprises low molecular weight polytetrafluoroethylene powder.
(25) The laminate according to any one of (16) to (24), wherein the cured fluororubber composition further comprises a phosphorus compound represented by the general formula $PR_3$, wherein the three Rs may be the same as or different from one another, and each R represents a halogen atom or an organic group.
(26) A tube or hose for transferring fuel, comprising the laminate according to any one of claims (16) to (25).
(27) A pipe for transferring fluid, comprising the laminate according to any one of claims (16) to (25).

Advantageous Effects of Invention

According to the present disclosure, a formulation that enables adhering fluororubber such as FKM and a chlorotrifluoroethylene copolymer or a tetrafluoroethylene copolymer directly can be provided.

BRIEF DESCRIPTION OF DRAWINGS

The features and advantages of the present disclosure will be more fully understood with reference to the detailed description in the next section when taken in conjunction with the following figures.

FIG. 1 is a scanning electron microscope ("SEM") image obtained for silica called "DM-20S" (product of Tokuyama Corporation) with a magnification of 100,000. A length of ten nicks appearing in the lower right-hand corner corresponds to 500 nm.

FIG. 2 is an SEM image obtained for silica called "HG-09" (product of Tokuyama Corporation) with a magnification of 100,000. A length of ten nicks appearing in the lower right-hand corner corresponds to 500 nm.

FIG. 3 is an SEM image obtained for silica called "PM-20" (product of Tokuyama Corporation) with a magnification of 100,000. A length of ten nicks appearing in the lower right-hand corner corresponds to 500 nm.

FIG. 4 is an SEM image obtained for silica called "SIDISTAR (registered trademark) R300" (product of Elkem Japan K.K.) with a magnification of 50,000. A length of ten nicks appearing in the lower right-hand corner corresponds to 1.00 μm.

FIG. 5 is an SEM image obtained for silica called "SIDISTAR (registered trademark) T120U" (product of Elkem Japan K.K.) with a magnification of 50,000. A length of ten nicks appearing in the lower right-hand corner corresponds to 1.00 μm.

FIG. 6 is an SEM image of a cured fluororubber composition containing the "SIDISTAR (registered trademark)

R300" silica (product of Elkem Japan K.K.) taken from Example 1 of Table 3 described later, with a magnification of 20,000.

FIG. 7 presents an image obtained from elemental-mapping analysis of what corresponds to FIG. 6, and shows the distribution of silicon atoms, with a magnification of 20,000.

FIG. 8 shows a image of the silicon atoms detected (namely, FIG. 7) overlaid on top of the SEM image of FIG. 6.

DESCRIPTION OF EMBODIMENTS

As part of conventional technology, it is possible to adhere NBR and a CTFE/TFE/PAVE copolymer directly by adding a 1,8-diazabicyclo(5.4.0)-undec-7-ene salt (DBU salt), a 1,5-diazabicyclo(4.3.0)-non-5-ene salt (DBN salt), 1,8-diazabicyclo(5.4.0)-undec-7-ene (DBU), or 1,5-diazabicyclo(4.3.0)-non-5-ene (DBN) to NBR. This technology also works for adhering ECO and a CTFE/TFE/PAVE copolymer directly. However, fluororubber such as FKM and a fluoropolymer such as a CTFE/TFE/PAVE copolymer cannot be adhered directly with each other using this technology. The present inventors have discovered that one can adhere fluororubber such as FKM and a fluoropolymer such as a CTFE/TFE/PAVE copolymer directly by adding silica having specific characteristics to the fluororubber formulation. These characteristics are represented by the particle size and the circularity of the silica particles.

Specifically, as measured before being mixed into a fluororubber formulation, the silica has an average value of the product "(particle size)×(circularity)" taken over the particles that is preferably 17.5 nm or higher, more preferably 20.0 nm or higher, still more preferably 30.0 nm or higher, particularly preferably 50.0 nm or higher, and most preferably 70.0 nm or higher. As measured before being mixed into a fluororubber formulation, the average value of the product "(particle size)×(circularity)" taken over the silica particles is also preferably 500 μm or less, more preferably 300 μm or less, still more preferably 100 μm or less, particularly preferably 50 μm or less, and most preferably 30 μm or less. 20 μm or less and 10 μm or less are also preferred as the average value.

As measured before being mixed into a fluororubber formulation, the silica may also have an average particle size that is preferably 25.0 nm or more, more preferably 30.0 nm or more, still more preferably 40.0 nm or more, particularly preferably 60.0 nm or more, and most preferably 80.0 nm or more. As measured before being mixed into a fluororubber formulation, the average particle size of the silica is also preferably 500 μm or less, more preferably 300 μm or less, still more preferably 100 μm or less, particularly preferably 50 μm or less, and most preferably 30 μm or less. 20 μm or less and 10 μm or less are also preferred as the average particle size.

As measured before being mixed into a fluororubber formulation, the silica may also have an average circularity that is preferably 0.80 or more, and more preferably 0.85 or more. The theoretical upper limit of circularity is 1, when the shape at issue represents a perfect circle.

As measured after being incorporated into a fluororubber formulation and then cured, the silica has an apparent average value of the product "(particle size)×(circularity)" taken over the particles that is preferably 32.0 nm or higher, more preferably 40.0 nm or higher, still more preferably 50.0 nm or higher, particularly preferably 60.0 nm or higher, and most preferably 70.0 nm or higher. 100 nm or higher and 150 nm or higher are also preferred as the apparent average value. As measured after being incorporated into a fluororubber formulation and then cured, the apparent average value of the product "(particle size)×(circularity)" taken over the silica particles is also preferably 500 μm or less, more preferably 400 μm or less, still more preferably 300 μm or less, and particularly preferably 200 μm or less. 100 μm or less, 50 μm or less and 20 μm or less are also preferred as the apparent average value.

As measured after being incorporated into a fluororubber formulation and then cured, the silica may also have an apparent average particle size that is preferably 40.0 nm or more, more preferably 50.0 nm or more, still more preferably 60.0 nm or more, and particularly preferably 80.0 nm or more. 100 nm or higher, 150 nm or higher and 200 nm or higher are also preferred as the apparent average particle size. As measured after being incorporated into a fluororubber formulation and then cured, the apparent average particle size of the silica is also preferably 500 μm or less, more preferably 300 μm or less, still more preferably 100 μm or less, particularly preferably 50 μm or less, and most preferably 30 μm or less.

Furthermore, the silica as specified in the present disclosure is effective in achieving direct adhesion between fluororubber (such as FKM) and a fluoropolymer (such as a CTFE/TFE/PAVE copolymer) even when any one of, any two of, or all three of low molecular weight polytetrafluoroethylene (PTFE) powder, phosphorus compounds, and basic multifunctional compounds are contained in the fluororubber formulation.

Thus, the present disclosure provides, among other things, a cured laminate in which a fluororubber layer (such as FKM) and a fluoropolymer layer (such as a CTFE/TFE/PAVE copolymer layer) are firmly adhered to each other without using a conventional adhesive and without performing surface treatment on the fluororubber layer or on the fluoropolymer layer.

The present disclosure also relates, among other things, to an uncured laminate comprising a fluororubber layer (A) and a fluoropolymer layer (B) on the fluororubber layer (A), in which the fluororubber layer (A) is a layer made of a fluororubber composition for curing. The fluororubber composition for curing contains an uncured fluororubber and silica having an average value within a specified range of the product "(particle size)×(circularity)" taken over the particles, the fluoropolymer layer (B) is a layer made of a fluoropolymer composition, and the copolymer composition contains a fluoropolymer having a copolymer unit derived from chlorotrifluoroethylene (CTFE) or a fluoropolymer having a copolymer unit derived from tetrafluoroethylene (TFE) and a unit derived from a monomer other than TFE. The silica may further have an average particle size within a specified range, and also an average circularity within a specified range.

In laminating a fluoropolymer layer and a fluororubber layer to form a laminate of the present disclosure, firm adhesion is obtained during curing of fluororubber without complicated procedures. Therefore, special procedures for adhering are not needed. This allows easy formation of a laminate at a low cost. In addition, since common forming methods such as extrusion can be employed, thinner laminate products can be produced so that bendability (flexibility) is improved.

Accordingly, one aspect of the present disclosure relates to a laminate containing a fluororubber layer (A) and a fluoropolymer layer (B) on the fluororubber layer (A). Here, the fluororubber layer (A) is a layer made of a fluororubber composition for curing, and the fluororubber composition for curing contains an uncured fluororubber and silica having an average value of the product "(particle size)×(circularity)" taken over the particles that is preferably 17.5 nm or higher, more preferably 20.0 nm or higher, still more preferably 30.0 nm or higher, particularly preferably 50.0 nm or higher, and most preferably 70.0 nm or higher. The average value of the product "(particle size)×(circularity)" taken over the silica particles is also preferably 500 μm or less, more preferably 300 μm or less, still more preferably 100 μm or less, particularly preferably 50 μm or less, and most preferably 30 μm or less.

The silica may also have an average particle size that is preferably 25.0 nm or more, more preferably 30.0 nm or more, still more preferably 40.0 nm or more, particularly preferably 60.0 nm or more, and most preferably 80.0 nm or more. The average particle size of the silica may also be preferably 500 μm or less, more preferably 300 μm or less, still more preferably 100 μm or less, particularly preferably 50 μm or less, and most preferably 30 μm or less. The silica may also have an average circularity that is preferably 0.80 or more, and more preferably 0.85 or more.

As to the amount of the silica contained in the fluororubber composition for curing, the lower limit is preferably 1 part by mass or more, more preferably 5 parts by mass or more, still more preferably 10 parts by mass or more, particularly preferably 16 parts by mass or more, and most preferably 20 parts by mass or more, relative to 100 parts by mass of the uncured fluororubber. The upper limit of the amount of the silica contained in the fluororubber composition for curing is preferably 100 parts by mass or less, more preferably 70 parts by mass or less, still more preferably 50 parts by mass or less, and particularly preferably 40 parts by mass or less, relative to 100 parts by mass of the uncured fluororubber.

The fluoropolymer layer (B) is a layer made of a fluoropolymer composition, and the copolymer composition contains a fluoropolymer that is a chlorotrifluoroethylene (CTFE) copolymer or a tetrafluoroethylene (TFE) copolymer. As an example, the CTFE copolymer may contain only a CTFE unit, a tetrafluoroethylene (TFE) unit, and a perfluoro(alkylvinylether) (PAVE) unit. The ratio between the CTFE unit and the TFE unit in the CTFE copolymer may be CTFE unit/TFE unit=15-90/85-10 (in mol %), and the amount of the PAVE unit may be not smaller than 0.5 mol % and not larger than 5 mol % of all the monomer units. The TFE copolymer preferably comprises a tetrafluoroethylene unit and a unit derived from at least one monomer selected from the group consisting of perfluoro(alkylvinylether), vinylidene fluoride and a monomer represented by the general formula: $CX^8X^9=CX^{10}Y$, wherein $X^8$, $X^9$ and $X^{10}$ are independently F or H, Y is —Cl or —$Rf^5$—Br, $Rf^5$ is single bond or a $C_1$-$C_5$ perfluoroalkylene group.

Another aspect of the present disclosure relates to the laminate as described above, in which the fluororubber composition for curing further contains any one of, any two of, or all three of low molecular weight polytetrafluoroethylene (PTFE) powder, phosphorus compounds, and basic multifunctional compounds.

A further aspect of the present disclosure relates to the laminate as described above, in which the fluororubber composition for curing further contains a peroxide curing agent.

A further aspect of the present disclosure relates to the laminate as described above, in which the fluororubber layer (A) is laminated on both faces of the fluoropolymer layer (B).

A further aspect of the present disclosure relates to the laminate as described above, in which the fluoropolymer layer (B) is laminated on both faces of the fluororubber layer (A).

A further aspect of the present disclosure relates to the laminate as described above, which further contains a polymer layer (C) other than the fluororubber layer (A) and the fluoropolymer layer (B), on the fluororubber layer (A) or on the fluoropolymer layer (B).

A further aspect of the present disclosure relates to a laminate obtained by curing the laminate as described above, in which a cured fluororubber layer produced from the fluororubber layer (A) and the fluoropolymer layer (B) are adhered with each other by curing.

Yet another aspect of the present disclosure relates to a laminate containing a cured fluororubber layer (A1) and a fluoropolymer layer (B) on the cured fluororubber layer (A1). Here, the cured fluororubber layer (A1) is a layer made of a cured fluororubber composition, and the cured fluororubber composition contains a cured fluororubber and silica having an apparent average value of the product "(particle size)×(circularity)" taken over the particles that is preferably 32.0 nm or higher, more preferably 40.0 nm or higher, still more preferably 50.0 nm or higher, particularly preferably 60.0 nm or higher, and most preferably 70.0 nm or higher. 100 nm or higher and 150 nm or higher are also preferred as the apparent average value. The apparent average value of the product "(particle size)×(circularity)" taken over the silica particles is also preferably 500 μm or less, more preferably 400 μm or less, still more preferably 300 μm or less, and particularly preferably 200 μm or less. 100 μm or less, 50 μm or less and m or less are also preferred as the apparent average value.

The silica contained in the cured fluororubber composition may also have an apparent average particle size that is preferably 40.0 nm or more, more preferably 50.0 nm or more, still more preferably 60.0 nm or more, and particularly preferably 80.0 nm or more. 100 nm or higher, 150 nm or higher and 200 nm or higher are also preferred as the apparent average particle size. The apparent average particle size of the silica is also preferably 500 μm or less, more preferably 300 μm or less, still more preferably 100 μm or less, particularly preferably 50 μm or less, and most preferably 30 μm or less.

As to the amount of the silica contained in the cured fluororubber composition, the lower limit is preferably 1 part by mass or more, more preferably 5 parts by mass or more, still more preferably 10 parts by mass or more, particularly preferably 16 parts by mass or more, and most preferably 20 parts by mass or more, relative to 100 parts by mass of the cured fluororubber. The upper limit of the amount of the silica contained in the cured fluororubber composition is preferably 100 parts by mass or less, more preferably 70 parts by mass or less, still more preferably 50 parts by mass or less, and particularly preferably 40 parts by mass or less, relative to 100 parts by mass of the cured fluororubber.

The fluoropolymer layer (B) is a layer made of a fluoropolymer composition, and the copolymer composition contains a fluoropolymer that is a chlorotrifluoroethylene (CTFE) copolymer or a tetrafluoroethylene (TFE) copolymer. As an example, the CTFE copolymer may contain only a CTFE unit, a tetrafluoroethylene (TFE) unit, and a perfluoro(alkylvinylether) (PAVE) unit. The ratio between the CTFE unit and the TFE unit in the CTFE copolymer may be CTFE unit/TFE unit=15-90/85-10 (in mol %), and the amount of the PAVE unit may be not smaller than 0.5 mol % and not larger than 5 mol % of all the monomer units. The TFE copolymer preferably comprises a tetrafluoroethylene unit and a unit derived from at least one monomer selected from the group consisting of perfluoro(alkylvinylether), vinylidene fluoride and a monomer represented by the general formula: $CX^8X^9=CX^{10}Y$, wherein $X^8$, $X^9$ and $X^{10}$ are independently F or H, Y is —Cl or —$Rf^5$—Br, $Rf^5$ is single bond or a $C_1$-$C_5$ perfluoroalkylene group.

A further aspect of the present disclosure relates to the (A1)-(B) laminate as described above, in which the cured fluororubber composition further contains any one of, any two of, or all three of low molecular weight polytetrafluoroethylene (PTFE) powder, phosphorus compounds, and basic multifunctional compounds.

A further aspect of the present disclosure relates to the (A1)-(B) laminate as described above, in which the cured fluororubber layer (A1) is laminated on both faces of the fluoropolymer layer (B).

A further aspect of the present disclosure relates to the (A1)-(B) laminate as described above, in which the fluoropolymer layer (B) is laminated on both faces of the cured fluororubber layer (A1).

A further aspect of the present disclosure relates to the (A1)-(B) laminate as described above, which further contains a polymer layer (C) other than the cured fluororubber layer (A1) and the fluoropolymer layer (B), on the cured fluororubber layer (A1) or on the fluoropolymer layer (B).

The detailed description that follows generally describes various exemplary embodiments of the present disclosure, and should not be considered to be exclusive of other equally effective embodiments, as would be understood by those of ordinary skill in the art. Further, numerous specific details are given in order to provide a thorough understanding of the embodiments and other examples. In some instances, however, well-known methods, procedures, and components have not been described in detail, so as to not obscure the following descriptions. The embodiments and examples disclosed are for exemplary purposes only. Other embodiments and examples may be employed in lieu of, or in combination with, the embodiments and examples disclosed. In what follows, unless otherwise specified, the amounts of the components in a composition are all expressed in weight % relative to the total amount of the composition. Also, where a numerical range is provided, it is understood that the end points, all numerical subsets of that range, and all the individual integers contained therein, are provided as part of the present disclosure.

One aspect of the present disclosure relates to a laminate that has a fluororubber layer (A) and a fluoropolymer layer (B) on the fluororubber layer (A). Descriptions of each layer are given in what follows. The term "layer" as used in the present disclosure means a sheet-like (but not necessarily flat) structure having a macroscopically well-defined, two-dimensional (but not necessarily flat) surface. The term "laminate" as used in the present disclosure means a structure made of a plurality of layers, in which each layer overlies or underlies another layer with the respective two-dimensional surfaces touching each other.

I. Fluororubber Layer (A)

The fluororubber layer (A) is made of a fluororubber composition for curing. The fluororubber composition for curing contains an uncured fluororubber and silica, and may further contain a curing agent, a basic multifunctional compound, or both. When the fluororubber composition for curing contains a curing agent and a basic multifunctional compound, the fluororubber layer (A) and the fluoropolymer layer (B) can be adhered to each other more strongly upon curing. The fluororubber composition for curing may also contain either one of or both of low molecular weight polytetrafluoroethylene (PTFE) powder and a phosphorus compound.

a. Uncured Fluororubber

The fluororubber is usually formed from an amorphous polymer that has a fluorine atom bonded to a carbon atom constituting the main chain and that has rubber elasticity as well. The fluororubber may be formed from one type of polymer, or it may be formed from two or more types of polymers. The fluororubber usually does not have a clear melting point.

The fluororubber is preferably at least one type selected from the group consisting of vinylidene fluoride (VdF)/hexafluoropropylene (HFP) copolymers, VdF/HFP/tetrafluoroethylene (TFE) copolymers, TFE/propylene copolymers, TFE/propylene/VdF copolymers, ethylene/HFP copolymers, ethylene/HFP/VdF copolymers, ethylene/HFP/TFE copolymers, VdF/TFE/perfluoro(alkylvinylether) (PAVE) copolymers, VdF/chlorotrifluoroethylene (CTFE) copolymers, and $VdF/CH_2=CFRf^3$ copolymers (in the formula, $Rf^3$ represents a linear or branched $C_1$-$C_{12}$ fluoroalkyl group). The fluororubber is preferably a non-perfluoro fluororubber, and more preferably it is a copolymer containing a polymerized unit derived from vinylidene fluoride (a VdF unit).

The VdF unit-containing copolymer is preferably a copolymer containing a VdF unit and a copolymerized unit derived from a fluorine-containing ethylenic monomer (excluding, however, a VdF unit; hereinafter also referred to as "fluorine-containing ethylenic monomer unit (a)"). The VdF unit-containing copolymer may be a copolymer that consists only of a VdF unit and a fluorine-containing ethylenic monomer unit (a), or may be a copolymer that further contains a copolymerized unit derived from a monomer copolymerizable with VdF and a fluorine-containing ethylenic monomer (excluding, however, VdF; hereinafter also referred to as "fluorine-containing ethylenic monomer (a)").

The VdF unit-containing copolymer contains, relative to a total of 100 mol % of the VdF unit and the fluorine-containing ethylenic monomer unit (a), preferably 30 to 90 mol % of the VdF unit and 70 to 10 mol % of the fluorine-containing ethylenic monomer unit (a), more preferably 30 to 85 mol % of the VdF unit and 70 to 15 mol % of the fluorine-containing ethylenic monomer unit (a), and still more preferably 30 to 80 mol % of the VdF unit and 70 to 20 mol % of the fluorine-containing ethylenic monomer unit (a).

The amount of the copolymerized unit derived from a monomer copolymerizable with VdF and the fluorine-containing ethylenic monomer (a) (excluding, however, a VdF unit) is preferably 0 to 10 mol % relative to the total amount of the VdF unit and the fluorine-containing ethylenic monomer unit (a).

Examples of the fluorine-containing ethylenic monomer (a) include fluorine-containing monomers such as TFE, CTFE, trifluoroethylene, HFP, trifluoropropylene, tetrafluoropropylene, pentafluoropropylene, trifluorobutene, tetrafluoroisobutene, PAVE, vinyl fluoride, and fluorovinyl ethers represented by the following general formula (1):

$$CFX=CXOCF_2OR^1 \qquad (1)$$

(in the formula, Xs may be the same as or different from each other, and each represents H, F, or $CF_3$, and $R^1$ represents a linear or branched $C_1$-$C_6$ fluoroalkyl group that may contain one or two atoms that are at least one type selected from the group consisting of H, Cl, Br, and I, or a $C_5$-$C_6$ cyclic fluoroalkyl group that may contain one or two atoms that are at least one type selected from the group consisting of H, Cl, Br, and I). Among these, at least one type selected from the group consisting of fluorovinyl ethers represented by the formula (1), TFE, HFP, and PAVE is preferred, and at least one type selected from the group consisting of TFE, HFP, and PAVE is more preferred.

The PAVE is preferably represented by the general formula (2):

$$CF_2=CFO(CF_2CFY^1O)_p-(CF_2CF_2CF_2O)_q-Rf \quad (2)$$

(in the formula, $Y^1$ represents F or $CF_3$, Rf represents a $C_1$-$C_5$ perfluoroalkyl group, p represents an integer of 0 to 5, and q represents an integer of 0 to 5). The PAVE is more preferably perfluoro(methylvinylether) or perfluoro(propylvinylether), and still more preferably is perfluoro(methylvinylether). Each of these may be used alone or in any combination with one another.

Examples of the monomer copolymerizable with VdF and the fluorine-containing ethylenic monomer (a) include ethylene, propylene, and alkylvinylethers.

Specific preferred examples of such a VdF unit-containing copolymer include at least one type of copolymer selected from the group consisting of VdF/HFP copolymers, VdF/HFP/TFE copolymers, VdF/CTFE copolymers, VdF/CTFE/TFE copolymers, VdF/PAVE copolymers, VdF/TFE/PAVE copolymers, VdF/HFP/PAVE copolymers, and VdF/HFP/TFE/PAVE copolymers. Particularly preferred among these VdF unit-containing copolymers is at least one type of copolymer selected from the group consisting of VdF/HFP copolymers and VdF/HFP/TFE copolymers from the viewpoint of heat resistance. These VdF unit-containing copolymers preferably meet the above-described proportions of the VdF unit and the fluorine-containing ethylenic monomer unit (a).

The VdF/HFP copolymer preferably has a VdF/HFP molar ratio of (45 to 85)/(55 to 15), more preferably (50 to 80)/(50 to 20), and still more preferably (60 to 80)/(40 to 20).

The VdF/HFP/TFE copolymer preferably has a VdF/HFP/TFE molar ratio of (30 to 85)/(5 to 50)/(5 to 40), more preferably a VdF/HFP/TFE molar ratio of (35 to 80)/(8 to 45)/(8 to 35), still more preferably a VdF/HFP/TFE molar ratio of (40 to 80)/(10 to 40)/(10 to 30), and most preferably a VdF/HFP/TFE molar ratio of (40 to 80)/(10 to 35)/(10 to 30).

The VdF/PAVE copolymer preferably has a VdF/PAVE molar ratio of (65 to 90)/(10 to 35).

The VdF/TFE/PAVE copolymer preferably has a VdF/TFE/PAVE molar ratio of (40 to 80)/(3 to 40)/(15 to 35).

The VdF/HFP/PAVE copolymer preferably has a VdF/HFP/PAVE molar ratio of (65 to 90)/(3 to 25)/(3 to 25).

The VdF/HFP/TFE/PAVE copolymer preferably has a VdF/HFP/TFE/PAVE molar ratio of (40 to 90)/(0 to 25)/(0 to 40)/(3 to 35), and more preferably (40 to 80)/(3 to 25)/(3 to 40)/(3 to 25).

The fluororubber is also preferably formed from a copolymer containing a copolymerized unit derived from a monomer that imparts a cross-linking site. Examples of a monomer that imparts a cross-linking site include iodine-containing monomers such as perfluoro(6,6-dihydro-6-iodo-3-oxa-1-hexene) and perfluoro(5-iodo-3-oxa-1-pentene), bromine-containing monomers, cyano group-containing monomers, carboxyl group-containing monomers, and alkoxycarbonyl group-containing monomers.

The fluororubber is also preferably a fluororubber having an iodine atom or a bromine atom at an end of the main chain. A fluororubber having an iodine atom or a bromine atom at an end of the main chain can be produced by emulsion polymerization of monomers with addition of a radical initiator in an aqueous medium in the presence of a halogen compound and in a substantial absence of oxygen. A typical example of a halogen compound to be used may be, for example, a compound represented by the general formula:

$$R^2I_xBr_y$$

(in the formula, x and y each represent an integer of 0 to 2 and satisfy $1 \leq x+y \leq 2$, and $R^2$ represents a saturated or unsaturated $C_1$-$C_{16}$ fluorohydrocarbon group, a saturated or unsaturated $C_1$-$C_{16}$ chlorofluorohydrocarbon group, a $C_1$-$C_3$ hydrocarbon group, or a $C_3$-$C_{10}$ cyclic hydrocarbon group that may be substituted with an iodine atom or a bromine atom, each of which may also contain an oxygen atom).

Examples of the halogen compound include 1,3-diiodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1, 2-bromo-4-iodoperfluorobutene-1, monoiodo-monobromo-substituted benzene, diiodo-monobromo-substituted benzene, and (2-iodoethyl)- and (2-bromoethyl)-substituted benzene. Each of these compounds may be used alone or in any combination with one another.

Among these, it is preferable to use 1,4-diiodoperfluorobutane or diiodomethane from such viewpoints as polymerization reactivity, cross-linking reactivity, and easy availability.

The fluororubber preferably has a Mooney viscosity ($ML_{1+10}$ (100° C.)) of 5 to 200, more preferably of 10 to 150, and still more preferably of 20 to 100, from the viewpoint of good processability in the production of a fluororubber composition.

Mooney viscosity can be measured in accordance with ASTM-D1646.

Measurement apparatus: MV2000E (manufactured by Alpha Technologies).
Rotor rotation speed: 2 rpm.
Measurement temperature: 100° C.

Finally, the rubber component of the fluororubber composition for curing preferably consists only of the fluororubber.

b. Silica

The fluororubber composition for curing of the present disclosure also contains silica. As measured before being mixed into a fluororubber formulation, the silica has an average value of the product "(particle size)×(circularity)" taken over the particles that is preferably 17.5 nm or higher, more preferably 20.0 nm or higher, still more preferably 30.0 nm or higher, particularly preferably 50.0 nm or higher, and most preferably 70.0 nm or higher. As measured before being mixed into a fluororubber formulation, the average value of the product "(particle size)×(circularity)" taken over the silica particles is also preferably 500 μm or less, more preferably 300 μm or less, still more preferably 100 μm or less, particularly preferably 50 μm or less, and most preferably 30 µm or less. 20 µm or less and 10 µm or less are also preferred as the average value.

As measured before being mixed into a fluororubber formulation, the silica may also have an average particle size that is preferably 25.0 nm or more, more preferably 30.0 nm or more, still more preferably 40.0 nm or more, particularly preferably 60.0 nm or more, and most preferably 80.0 nm or more. As measured before being mixed into a fluororubber formulation, the average particle size of the silica is also preferably 500 µm or less, more preferably 300 µm or less, still more preferably 100 µm or less, particularly preferably 50 µm or less, and most preferably 30 µm or less. 20 µm or less and 10 µm or less are also preferred as the average particle size.

As measured before being mixed into a fluororubber formulation, the silica may also have an average circularity that is preferably 0.80 or more, and more preferably 0.85 or more. The theoretical upper limit of circularity is 1, when the shape at issue represents a perfect circle.

In the present disclosure, an "average particle size" of silica as measured before being mixed into a fluororubber formulation is defined and measured by adsorbing the silica particles on a polyethylene terephthalate (PET) film, coating the film by use of platinum sputtering, and performing an image analysis of a scanning electron microscope ("SEM") photograph of the silica particles in the coated film, in which after the SEM photograph is processed for noise removal and binarization, one hundred (100) particles are randomly chosen from the processed image, and an average size of the silica particles appearing in the two-dimensional image having a depth of field of 1 to 2 µm is measured. Here, for a circular two-dimensional shape, "size" corresponds to the diameter (not the radius). For a non-circular two-dimensional shape having an area S, "size" is obtained by taking the square root of (4×S/π), which can be deemed as equivalent to a circle diameter.

In the present disclosure, an "average circularity" of silica as measured before being mixed into a fluororubber formulation is defined and measured by adsorbing the silica particles on a PET film, coating the film by use of platinum sputtering, and performing an image analysis of an SEM photograph of the silica particles in the coated film, in which after the SEM photograph is processed for noise removal and binarization, one hundred (100) particles are randomly chosen from the processed image, and an average circularity of the silica particles appearing in the two-dimensional image having a depth of field of 1 to 2 µm is measured. A "circularity" value of a two-dimensional shape is defined as follows.

(Circularity)=4π×(Area of binarized image of two-dimensional cross section of silica particle)/(Circumference of binarized image of two-dimensional cross section of silica particle)$^2$ The closer to 1 (one) a circularity value is, the closer to a perfect circle the corresponding two-dimensional shape is.

In the present disclosure, an "average value of the product '(particle size)×(circularity)'" taken over the silica particles as measured before being mixed into a fluororubber formulation is defined and measured by adsorbing the silica particles on a PET film, coating the film by use of platinum sputtering, and performing an image analysis of an SEM photograph of the silica particles in the coated film, in which after the SEM photograph is processed for noise removal and binarization, one hundred (100) particles are randomly chosen from the processed image, and an average of the product "(particle size)×(circularity)" of the silica particles appearing in the two-dimensional image having a depth of field of 1 to 2 µm is measured.

In the measurements of an average particle size, an average circularity, and an average value of the product "(particle size)×(circularity)" above, only those silica particles that have clear outlines are chosen as representative samples, and overlapping silica particles are disregarded, because an aggregate of particles may mistakenly be counted as a large single particle, and because shades of gray within a particle image will not be recognized as being part of a particle.

For the definitions and measurements of an "apparent average particle size," an "apparent average circularity," and an "apparent average value of the product '(particle size)×(circularity)'" of the silica particles after being incorporated into a fluororubber formulation and then cured, the cured fluororubber formulation is frozen with liquid nitrogen first. Then, the frozen, cured fluororubber formulation is split, and an SEM photograph is taken of the cross section that appears. FIG. 6 is an example of such an SEM photograph. Within the SEM photograph, silicon atoms are identified and located through elemental-mapping analysis by SEM-EDX (Energy Dispersive X-ray) measurements. FIG. 7 is an example of an image obtained by such an elemental-mapping analysis, showing the distribution of silicon atoms. Finally, the image that maps out the silicon atoms is overlaid on top of the initial SEM photograph, and one hundred (100) particles of silica thus identified and located are randomly chosen to conduct the same analyses as above to obtain the "apparent average particle size," the "apparent average circularity," and the "apparent average value of the product '(particle size)×(circularity)'" of the silica particles after being incorporated into a fluororubber formulation and then cured. FIG. 8 is an example of such an overlaid SEM image. As long as one hundred (100) silica particles can be randomly sampled, one may rely on a single SEM photograph or a series of SEM photographs for these measurements.

The silica may be basic silica or acidic silica. From the standpoint of adhesiveness and rubber properties, the lower limit of the amount of the silica to be added to the fluororubber formulation is preferably 1 part by mass or more, more preferably 5 parts by mass or more, still more preferably 10 parts by mass or more, particularly preferably 16 parts by mass or more, and most preferably 20 parts by mass or more, relative to 100 parts by mass of the uncured fluororubber, and the upper limit of the amount of the silica to be added to the fluororubber formulation is preferably 100 parts by mass or less, more preferably 70 parts by mass or less, still more preferably 50 parts by mass or less, and particularly preferably 40 parts by mass or less, relative to 100 parts by mass of the uncured fluororubber. A laminate having the specific composition of the present disclosure is allowed to have excellent adhesiveness upon curing by containing the silica. The surface of the silica may be hydrophobized or not hydrophobized.

c. Curing Agent

The curing agent may be a conventionally known kind chosen in accordance with the curing system of the fluororubber composition for curing. Curing of uncured fluororubber enhances the mechanical strength such as tensile strength of the fluororubber, and provides a cured fluororubber layer with fine elasticity.

The curing system usable in the present disclosure includes any one of polyamine curing system, polyol curing system, peroxide curing system, imidazole curing system, triazine curing system, oxazole curing system, and thiazole curing system. It may be appropriately selected in accordance with the type of a curable group (cure site) in cases in which the uncured fluororubber contains a cure site, and also in accordance with the properties to be imparted to the cured laminate as well as its applications.

The fluororubber composition for curing preferably contains a curing agent for peroxide curing system. The curing agent for peroxide curing system is not particularly limited, and may, for example, be an organic peroxide. The organic peroxide is preferably one that easily generates peroxy radicals in the presence of heat or a redox system, and examples include 1,1-bis(t-butylperoxy)-3,5,5-trimethylcyclohexane, 2,5-dimethylhexane-2,5-dihydroxyperoxide, di-t-butyl peroxide, t-butyl cumyl peroxide, dicumyl peroxide, α,α'-bis(t-butylperoxy)-p-diisopropylbenzene, 2,5-dimethyl-2,5-di(t-butylperoxy)hexane, 2,5-dimethyl-2,5-di(t-butylperoxy)hexyne-3, benzoyl peroxide, t-butylperoxybenzene, 2,5-dimethyl-2,5-di(benzoylperoxy)hexane, t-butylperoxy maleic acid, and t-butylperoxy isopropyl carbonate. In particular, 2,5-dimethyl-2,5-di(t-butylperoxy)hexane is more preferable.

When the curing agent is an organic peroxide, the fluororubber composition for curing of the present invention preferably contains a co-curing agent. Examples of a co-curing agent include triallyl cyanurate, trimethallyl isocyanurate, triallyl isocyanurate (TAIC), triacrylformal, triallyl trimellitate, N,N'-m-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, triallyl phosphite, N,N-diallyl acrylamide, 1,6-divinyl dodecafluorohexane, hexaallyl phosphoramide, N,N,N',N'-tetraallyl phthalamide, N,N,N',N'-tetraallyl malonamide, trivinyl isocyanurate, 2,4,6-trivinyl methyltrisiloxane, tri(5-norbornene-2-methylene)cyanurate, and triallyl phosphite. Among these, triallyl isocyanurate (TAIC) is preferable from the viewpoint of curability and properties of the cured fluororubbers.

The organic peroxide, when used as a curing agent, may be used together with a curing aid or a co-curing agent. The curing aid or the co-curing agent is not particularly limited, and may, for example, be the curing aids and the co-curing agents mentioned above.

Thus, the curing agent may be any one of a polyamine curing agent, a polyol curing agent, a peroxide curing agent, an imidazole curing agent, a triazine curing agent, an oxazole curing agent, and a thiazole curing agent. Each of these may be used alone, or two or more of these may be used in combination.

As to the amount of a curing agent or curing agents to be used, the lower limit is preferably 0.1 parts by mass or more, more preferably 0.5 parts by mass or more, and still more preferably 1.0 part by mass or more, relative to 100 parts by mass of the uncured fluororubber. The upper limit of the amount of a curing agent or curing agents to be used is preferably 10.0 parts by mass or less, more preferably 5.0 parts by mass or less, and still more preferably 3.0 parts by mass or less, relative to 100 parts by mass of the uncured fluororubber. If the amount is too small, the properties of the cured fluororubber tend to be deteriorated. If the amount is too large, the properties of the uncured fluororubber tend to be deteriorated.

When the curing or the pretreatment described later is performed under relatively low temperature, the amount of a curing agent is preferably more than 3.0 parts by mass and 10.0 parts by mass or less, more preferably more than 3.0 parts by mass and 6.0 parts by mass or less. The relatively large amount of a curing agent can provide an appropriate degree of curing and a sufficient adhesion strength even when the curing or the pretreatment is performed under relatively low temperature.

The amount of a co-curing agent to be used is preferably 0.1 parts by mass or more, more preferably 0.3 parts by mass or more, and still more preferably 0.5 parts by mass or more, relative to 100 parts by mass of the uncured fluororubber. And its upper limit is preferably 10.0 parts by mass or less, more preferably 7.0 parts by mass or less, and still more preferably 5.0 parts by mass or less, relative to 100 parts by mass of the uncured fluororubber.

When the curing or the pretreatment described later is performed under relatively low temperature, the amount of a co-curing agent is preferably more than 5.0 parts by mass and 10.0 parts by mass or less, more preferably more than 5.0 parts by mass and less than 7.0 parts by mass. The relatively large amount of a co-curing agent can provide an appropriate degree of curing and a sufficient adhesion strength even when the curing or the pretreatment is performed under relatively low temperature.

Furthermore, the silica as specified in the present disclosure is effective in directly adhering fluororubber such as FKM and a fluoropolymer such as a CTFE/TFE/PAVE copolymer even when any one of, any two of, or all three of low molecular weight polytetrafluoroethylene (PTFE) powder, phosphorus compounds, and basic multifunctional compounds are contained in the fluororubber formulation.

d. Basic Multifunctional Compound

The basic multifunctional compound is a compound that has two or more functional groups having the same structure or different structures within the molecule, and that exhibits basicity.

The functional groups in the basic multifunctional compound are preferably those that exhibit basicity, and for example, each of them is: preferably at least one selected from the group consisting of —$NH_2$, —$NH_3^+$, —NHCOOH, —$NHCOO^-$, —N=$CR^1R^2$ (in the formula, each of $R^1$ and $R^2$ is independently —H or an organic group with zero to twelve carbon atoms), —$NR^3R^4$ (in the formula, each of $R^3$ and $R^4$ is independently —H or an organic group with zero to twelve carbon atoms), —$NR^3R4R^5$ (in the formula, each of $R^3$, $R^4$, and $R^5$ is independently —H or an organic group with zero to twelve carbon atoms), and functional groups that are converted into any one of the aforementioned functional groups by heating; more preferably at least one selected from the group consisting of —$NH_2$, —$NH_3^+$, —N=$CR^1R^2$ (in the formula, $R^1$ and $R^2$ are defined in the same way as above), and —$NR^3R^4R^5$ (in the formula, $R^3$, $R^4$, and $R^5$ are defined in the same way as above); and still more preferably at least one selected from the group consisting of —$NH_2$, —$NH_3^+$, and —N=$CR^1R^2$ (in the formula, $R^1$ and $R^2$ are defined in the same way as above). Preferably each of $R^1$, $R^2$, $R^3$, $R^4$, and $R^5$ above is independently —H or an organic group with one to twelve carbon atoms, and more preferably —H or a hydrocarbon group with one to twelve carbon atoms. The hydrocarbon group may have one or two or more carbon-carbon double bonds. The number of carbon atoms of the hydrocarbon group is preferably one to eight. Preferably, $R^1$ is —H or —$CH_3$, and $R^2$ is —CH=$CHR^6$ ($R^6$ is a phenyl group (—$C_6H_5$), a benzyl group (—$CH_2$—$C_6H_5$), or —H). More preferably, $R^1$ is —H, and $R^2$ is —CH=CH—$C_6H_5$.

Examples of the basic multifunctional compound include ethylenediamine, propanediamine, putrescine, cadaverine, hexamethylenediamine, heptanediamine, octanediamine, nonanediamine, decanediamine, undecanediamine, dodecanediamine, phenylenediamine, N,N'-dicinnamylidene-1,6-hexamethylenediamine, N,N,N',N'-tetramethyl-1,6-hexamethylenediamine, N,N'-dimethyl-1,6-hexamethylenediamine, and 6-aminohexyl carbamic acid.

The basic multifunctional compound has at least two nitrogen atoms in the molecule, and the distance between the nitrogen atoms is 5.70 Å or greater. The distance between the nitrogen atoms is more preferably 6.30 Å or greater, still more preferably 7.60 Å or greater, and particularly preferably 8.60 Å or greater. The basic multifunctional compound having a large distance between the nitrogen atoms has increased flexibility and is easily cured. Here, the distance between the nitrogen atoms is calculated by the following method. That is, structural optimization of each base is computed by use of the density functional method (where program is Gaussian 03, density functional is B3LYP, and basis function is 6-31G*).

In terms of adhesion, the basic multifunctional compound is preferably at least one selected from the group consisting of N,N'-dicinnamylidene-1,6-hexamethylenediamine and $NH_2—(CH_2)_n—NH_2$ (in the formula, n is 5 to 12), and more preferably at least one compound selected from the group consisting of hexamethylenediamine and N,N'-dicinnamylidene-1,6-hexamethylenediamine.

The content of the basic multifunctional compound is preferably 0.5 parts by mass or more, more preferably 0.6 parts by mass or more, still more preferably 0.8 parts by mass or more, particularly preferably 1.0 part by mass or more, and most preferably 1.5 parts by mass or more, relative to 100 parts by mass of the uncured fluororubber. On the other hand, from the viewpoint of curing inhibition and cost, the content of the basic multifunctional compound is preferably 10 parts by mass or less, more preferably 6 parts by mass or less, still more preferably 5 parts by mass or less, and most preferably 3 parts by mass or less, relative to 100 parts by mass of the uncured fluororubber.

e. Low Molecular Weight PTFE Powder

The low molecular weight PTFE powder is preferably melt-fabricable and non-fibrillatable. Low molecular weight PTFE powder is sometimes referred to as "PTFE micropowder."

The low molecular weight PTFE is a TFE (tetrafluoroethylene) polymer having a number average molecular weight of 600,000 or less. A "high molecular weight PTFE" with a number average molecular weight of greater than 600,000 exhibits fibrillability distinctive of PTFE. A high molecular weight PTFE has a high melt viscosity, and is non-melt-fabricable. A high molecular weight PTFE exhibits fibrillation properties when used as an additive, and accordingly, the PTFE particles readily agglomerate with each other and thus have poor dispersibility in a matrix material.

The low molecular weight PTFE powder is a TFE polymer having a melt viscosity at 380° C. of $1\times10^2$ to $7\times10^5$ (Pa·s). When the PTFE has a melt viscosity within this range, the number average molecular weight of the PTFE falls within the range specified above. The melt viscosity is a value measured by pre-heating a two-gram (2 g) sample at 380° C. for 5 minutes and keeping it at the above temperature under a load of 0.7 MPa using a flow tester (manufactured by Shimadzu Corporation) and a 2φ-8L die, in accordance with ASTM D 1238. Each of the number average molecular weights indicated is a value calculated from the melt viscosity measured in the above manner.

The low molecular weight PTFE powder is preferably a TFE polymer having a melting point of 324° C. to 333° C.

The low molecular weight PTFE powder has an average particle size preferably of 0.01 to 1,000 μm, more preferably of 0.1 to 100 μm, still more preferably of 0.3 to 50 μm, and most preferably of 0.5 to 20 μm. The average particle size is taken to be equal to a value corresponding to 50% of the integration of the particle size distribution obtained by measuring a particle size distribution using a laser diffraction-type particle size distribution measuring device (e.g., manufactured by Japan Laser Corp.) at a pressure of 0.1 MPa and a measurement time of three seconds without use of cascade.

The low molecular weight PTFE powder preferably has a melt flow rate (MFR) at 372° C. (under a load of 1.2 kg) of 0.01 to 10 g/10 min. The MFR can be determined by measuring the weight (in g) of the polymer that flows out of a nozzle having a diameter of 2 mm and a length of 8 mm per unit time (10 minutes) at 372° C. under a load of 1.2 kg using a melt indexer (e.g., manufactured by Toyo Seiki Seisaku-sho, Ltd.).

The low molecular weight PTFE powder may be a TFE homopolymer or may be a modified PTFE containing a TFE unit and a modifying monomer unit copolymerizable with TFE. In the modified PTFE, the content of the modifying monomer units copolymerizable with TFE is preferably 0.010% to 1% by weight, more preferably 0.010% to 0.5% by weight, and most preferably 0.03% to 0.3% by weight, with respect to the entire monomer units.

In the present disclosure, the modifying monomer unit means a moiety that is a part of the molecular structure of the modified PTFE and derived from the modifying monomer, and the entire monomer units means moieties derived from all the monomers in the molecular structure of the modified PTFE. The content of the modifying monomer units is a value measured by an infrared spectroscopic analysis or by an NMR (nuclear magnetic resonance) analysis.

Examples of commercially-available low molecular weight PTFE powder include: L150J, L169J, L170JE, L172JE, and L173JE (products of Asahi Glass Co., Ltd.); L-2, L-5, L-5F, and L-7 (products of Daikin Industries, Ltd.); TF9205, TF9207Z, and TF9201Z (products of 3M); KT-300M, KT-400M, KT-600M, KTL-450A, KTL-450, KTL-620, KTL-610, KTL-20N, KTL-10S, KTL-9S, KTL-8N, KTL-4N, KTL-2N, KTL-1N, KTL-8F, KTL-8FH, and KTL-500F (products of Kitamura Limited); TLP-10F-1 and MP-1300-J (products of Chemours-Mitsui Fluoroproducts Co., Ltd.); and Cefural lube I and V (products of Central Glass Co., Ltd.).

f. Phosphorus Compound

A phosphorus compound is a compound that contains at least one phosphorus atom within a molecule, and as its examples, phosphines, phosphoric acid esters, phosphazenes, phosphine oxides, phosphonic acid esters, phosphinic acid esters, and the like may be exemplified.

The phosphorus compound is preferably at least one kind selected from the group consisting of phosphine compounds represented by the general formula $PR_3$ (in the formula, the three Rs may be the same as or different from one another, and each R represents a halogen atom or an organic group), phosphonium salts, and phosphine oxides, and is more preferably a phosphine compound.

The phosphine compound is represented by the general formula $PR_3$, and the three Rs in the formula may be the same as or different from one another, and respectively represent a halogen atom or an organic group. The phosphine compound also includes compounds that contain the structure represented by $PR_3$ such as triphenylphosphine hydrochloride, triphenylphosphine borane, and triphenylphosphine-triphenylphosphine borane complex. The phosphine-type compound is preferably at least one kind selected from the group consisting of 1,2-bis(diphenylphosphino)ethane, diphenylphosphinous chloride, tris(2,6-dimethoxyphenyl)phosphine, triphenylphosphine, and tributyl (cyanomethyl)phosphonium chloride, and among them, diphenylphosphinous chloride is particularly preferable.

As the organic group, hydrocarbon groups with 1 to 30 carbon atoms that may have substituent groups may be exemplified. The hydrocarbon group may be straight-chain, branched, monocyclic, or polycyclic, may have unsaturated bonds, may be aromatic, and may contain hetero atoms. As the substituent group, alkoxy groups, amino groups, cyano groups, aldehyde groups, carboxylic acid groups, halogen atoms, phosphine groups, phosphonate groups, diphenylphosphino groups, and the like may be exemplified.

g. Other Additives

The fluororubber composition for curing of the present disclosure preferably does not contain one of, two of, three of, or all of 1,8-diazabicyclo(5.4.0)-undec-7-ene (DBU), a 1,8-diazabicyclo(5.4.0)-undec-7-ene salt (DBU salt), 1,5-diazabicyclo(4.3.0)-non-5-ene (DBN), and a 1,5-diazabicyclo(4.3.0)-non-5-ene salt (DBN salt), which exhibit strong basicity, because fluororubbers generally do not have good resistance to strongly basic substances.

In the present disclosure, additives commonly used in preparing fluororubber compositions for curing may be added in accordance with the purposes and needs of individual applications. Examples of common additives include fillers, metal salts, processing aids, plasticizers, softeners, age inhibitors, colorants, stabilizers, adhesion aids, mold releasing agents, conductivity imparting agents, thermal conductivity imparting agents, anti-tackifiers for surfaces, tackifiers, flexibility imparting agents, thermal resistance improvers, flame retardants, UV absorbents, oil resistance improvers, foaming agents, anti-scorching agents, lubricants, and epoxy resins. Further, one or two or more common curing agents or curing accelerators other than the above-mentioned agents may be added. Here, the amount of these additives should be within a range that does not deteriorate the adhesiveness of the fluororubber layer (A) with the fluoropolymer layer (B), which is intended to be improved in the present disclosure.

Examples of fillers include: metal oxides such as calcium oxide, titanium oxide, and aluminum oxide; metal hydroxides such as magnesium hydroxide, aluminum hydroxide, and calcium hydroxide; carbonates such as magnesium carbonate, aluminum carbonate, calcium carbonate, and barium carbonate; silicates such as magnesium silicate, calcium silicate, sodium silicate, and aluminum silicate; sulfates such as aluminum sulfate, calcium sulfate, and barium sulfate; synthesized hydrotalcite; metal sulfides such as molybdenum disulfide, iron sulfide, and copper sulfide; and diatom earth, asbestos, lithopone (zinc sulfide/barium sulfide), graphite, carbon black, carbon fluoride, calcium fluoride, coke, quarts fine powder, zinc flower, talc, mica powder, wollastonite, carbon fiber, alamido fiber, various whiskers, glass fiber, organic stiffeners, and organic fillers.

Examples of processing aids include: higher fatty acids such as stearic acid, oleic acid, palmitic acid, and lauric acid; higher fatty acid salts such as sodium stearate and zinc stearate; higher fatty acid amides such as stearic amide and oleic amide; higher fatty acid esters such as ethyl oleate; higher fatty amines such as stearylamine and oleylamine; petroleum waxes such as carnauba wax and ceresin wax; polyglycols such as ethylene glycol, glycerol, and diethylene glycol; aliphatic hydrocarbons such as vaseline and paraffin; and silicone oils, silicone polymers, low molecular weight polyethylene, phthalate esters, phosphate esters, rosin, (halogenated) dialkyl amines, (halogenated) dialkyl sulfones, and surface active agents.

Examples of plasticizers include phthalic acid derivatives and sebacic acid derivatives.

Examples of softeners include lubricant oil, process oil, coal tar, castor oil, and calcium stearate.

Examples of age inhibitors include phenylenediamines, phosphates, quinolines, cresols, phenols, and dithiocarbamate metal salts.

Examples of epoxy resins include bisphenol A-type epoxy resins, bisphenol F-type epoxy resins, and polyfunctional epoxy resins. Among these, bisphenol A-type epoxy resins are preferable as they are excellent in chemical resistance and adhesiveness. Further, the bisphenol A-type epoxy resin represented by Formula (1) below

[Chem. 1]

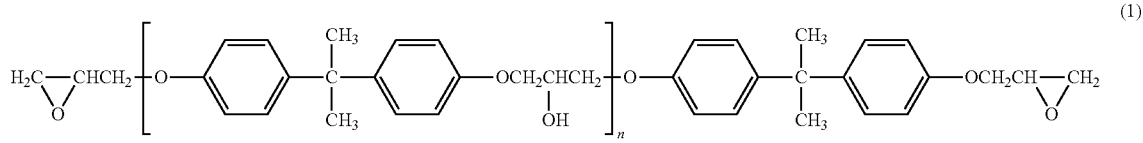

(1)

is particularly preferable. In Formula (1), n is an average value and is preferably 0.1 to 3, more preferably 0.1 to 0.5, and still more preferably 0.1 to 0.3. If n is less than 0.1, adhesiveness with fluoropolymer upon curing tends to be lowered. If n exceeds 3, the viscosity of the epoxy resin itself increases, and such an epoxy resin may be hardly uniformly dispersed in the fluororubber composition for curing.

When an epoxy resin is added, the amount added is preferably not less than 1 part by mass, more preferably not less than 2 parts by mass, and still more preferably not less than 3 parts by mass, relative to 100 parts by mass of the uncured fluororubber, in order to further improve adhesiveness upon curing. From the standpoint of avoiding a too-hard fluororubber layer, the amount is preferably not more than 25 parts by mass, more preferably not more than 15 parts by mass, and still more preferably not more than 10 parts by mass, relative to 100 parts by mass of the uncured fluororubber.

h. Preparation of Fluororubber Layer (A)

The fluororubber composition for curing of the present disclosure is prepared by compounding the uncured fluororubber and the silica, and if needed, the curing agent and other additives.

To impart conductivity to the fluororubber layer (A), a conductive filler may be added. The conductive filler is not particularly limited, and examples include a powdery or fibrous conductive elementary substance such as metals or carbons, powder of conductive compounds such as zinc oxide, and powder provided with electric conductivity by surface treatment. Carbon black, among the conductive fillers, is favorably used because it is advantageous in terms of economic efficiency and prevention of static charge build-up. Examples of conductive carbon black include DENKA BLACK (product of Denka Company Ltd.) and KETJENBLACK (product of Lion Specialty Chemicals Co., Ltd.).

The insulation resistance value of the fluororubber layer is preferably 10 MΩ or less, more preferably 5 MΩ or less, and still more preferably 1 MΩ or less. The insulation resistance value of a fluororubber layer is measured as follows. A fluororubber layer having a size of 15 cm×15 cm×2 mm is prepared through curing and molding. By using Analog Insulation Resistance Tester 24060 (manufactured by Yokogawa Electric Corporation), probe terminals are contacted at both ends of the fluororubber layer, and the insulation resistance value is measured when a voltage of 500 V is applied.

Compounding may be performed by using an open roll mixer, a banbury mixer, a pressure kneader, or the like, at a temperature of not higher than 200° C.

II. Fluoropolymer Layer (B)

The fluoropolymer layer (B) of the present disclosure is made of a fluoropolymer composition.

The fluoropolymer composition contains a fluoropolymer. The fluoropolymer is preferably a melt-processable resin. The fluoropolymer preferably has a clear melting point.

The fluoropolymer composition contains at least one selected from the group consisting of a fluoropolymer having a copolymer unit derived from chlorotrifluoroethylene (CTFE) and a fluoropolymer having a copolymer unit derived from tetrafluoroethylene (TFE).

The fluoropolymer is preferably a CTFE fluoropolymer. More specifically, the fluoropolymer is preferably at least one selected from the group consisting of polychlorotrifluoroethylene (PCTFE) and a CTFE copolymer.

The CTFE copolymer preferably contains a copolymer unit derived from CTFE (a CTFE unit) and a copolymer unit derived from at least one monomer selected from the group consisting of tetrafluoroethylene (TFE), hexafluoropropylene (HFP), perfluoro(alkylvinylether) (PAVE), vinylidene fluoride (VdF), vinyl fluoride, hexafluoroisobutene, a monomer represented by the formula $CH_2=CX^1(CF_2)_nX^2$ (in which $X^1$ represents H or F, $X^2$ represents H, F, or Cl, and n represents an integer of 1 to 10), ethylene, propylene, 1-butene, 2-butene, vinyl chloride, and vinylidene chloride.

The CTFE copolymer more preferably contains a CTFE unit and a copolymer unit derived from at least one monomer selected from the group consisting of TFE, HFP, and PAVE. Further, the CTFE copolymer still more preferably substantially contains only these copolymer units. In terms of lower fuel permeability, it is preferable that the CTFE copolymer does not contain a monomer having a C—H bond such as ethylene, vinylidene fluoride, or vinyl fluoride. In general, a perhalopolymer hardly adheres to fluororubber. In accordance with the composition of the present disclosure, however, adhesion between the fluoropolymer layer and the fluororubber layer is made strong upon curing even when the fluoropolymer layer is made of perhalopolymers.

The CTFE copolymer preferably has the CTFE unit in an amount of 10 to 90 mol % of the entire monomer units.

The CTFE copolymer particularly preferably contains a CTFE unit, a TFE unit, and a monomer (α) unit derived from a monomer (α) copolymerizable with CTFE and TFE.

The "CTFE unit" and the "TFE unit" are, respectively, a part derived from CTFE (—CFCl—CF$_2$—) and a part derived from TFE (—CF$_2$—CF$_2$—) in the molecular structure of the CTFE copolymer. Similarly, the "monomer (a) unit" is a part where a monomer (a) is added in the molecular structure of the CTFE-based copolymer.

The monomer (α) is not particularly limited as long as it is a monomer copolymerizable with CTFE and TFE. Examples of the monomer (α) include ethylene (Et), vinylidene fluoride (VdF), perfluoro(alkylvinylether) (PAVE) represented by $CF_2=CF—ORf^1$ (in which $Rf^1$ represents a $C_1$-$C_8$ perfluoroalkyl group), a vinyl monomer represented by $CX^3X^4=CX^5(CF_2)_nX^6$ (in which $X^3$, $X^4$, and $X^5$ are the same as or different from one another and represent a hydrogen atom or a fluorine atom, $X^6$ is a hydrogen atom, a fluorine atom, or a chlorine atom, and n represents an integer of 1 to 10), and an alkyl perfluoro vinylether derivative represented by $CF_2=CF—OCH_2—Rf^2$ (in which $Rf^2$ represents a $C_1$-$C_5$ perfluoroalkyl group). Among these, the monomer (α) is preferably at least one selected from the group consisting of PAVE, the vinyl monomer, and the alkyl perfluoro vinylether derivative. More preferably, the monomer (α) is at least one selected from the group consisting of PAVE and HFP.

The alkyl perfluoro vinylether derivative preferably has $Rf^2$ representing a $C_1$-$C_3$ perfluoroalkyl group. More preferably, the alkyl perfluoro vinylether derivative is $CF_2=CF—OCH_2—CF_2CF_3$.

The ratio between the CTFE unit and the TFE unit in the CTFE copolymer is preferably CTFE unit/TFE unit=15-90/85-10 (in mol %). More preferably, the ratio is CTFE unit/TFE unit=15-60/85-40 (in mol %). Still more preferably, the ratio is CTFE unit/TFE unit=15-40/85-60 (in mol %). Particularly preferably, the ratio is CTFE unit/TFE unit=15-25/85-75 (in mol %).

In the CTFE copolymer, preferably, the total amount of the CTFE unit and the TFE unit is 90 to 99.9 mol %, and the amount of the monomer (α) unit is 0.1 to 10 mol %. If the amount of the monomer (α) unit is less than 0.1 mol %, the fluoropolymer composition tends to have poor formability, poor environmental stress crack resistance, and poor fuel crack resistance. In contrast, if the amount of the monomer (α) unit is more than 10 mol %, the fluoropolymer layer (B) tends to have insufficiently-low fuel permeability, and to have poor thermal resistance and poor mechanical properties.

The fluoropolymer is most preferably PCTFE or a CTFE/TFE/PAVE copolymer. The CTFE/TFE/PAVE copolymer is a copolymer comprising a CTFE unit, a TFE unit and a PAVE unit, and is preferably a copolymer substantially consisting only of CTFE, TFE, and PAVE. PCTFE and the CTFE/TFE/PAVE copolymer each have no hydrogen atom directly bonded to a carbon atom constituting a main chain so that dehydrofluorination reaction cannot take place. Accordingly, a conventional method for improving adhesiveness cannot be employed, in which an unsaturated bond formed in the fluoropolymer by dehydrofluorination reaction is taken advantage of. In the present disclosure, the fluororubber layer (A) is a layer made of a fluororubber composition for curing having a predetermined composition. Therefore, adhesion between the fluororubber layer (A) and the fluoropolymer layer (B) is strong upon curing even when the fluoropolymer layer (B) is made of the CTFE/TFE/PAVE copolymer.

Examples of the PAVE include perfluoro(methylvinylether) (PMVE), perfluoro(ethylvinylether) (PEVE), perfluoro(propylvinylether) (PPVE), and perfluoro(butylvinylether). Among these, the PAVE is preferably at least one selected from the group consisting of PMVE, PEVE, and PPVE.

The amount of the PAVE unit is preferably not smaller than 0.5 mol % and not larger than 5 mol % of all the monomer units.

The constitutional units such as a CTFE unit may be quantified by $^{19}$F-NMR analyses.

The TFE copolymer preferably comprises a tetrafluoroethylene (TFE) unit and a unit derived from at least one monomer selected from the group consisting of perfluoro (alkylvinylether) (PAVE), vinylidene fluoride (VdF) and a monomer represented by the general formula: $CX^8X^9=CX^{10}Y$, wherein $X^8$, $X^9$ and $X^{10}$ are independently F or H, Y is —Cl or —Rf$^5$—Br, Rf$^5$ is single bond or a $C_1$-$C_5$ perfluoroalkylene group.

PAVE is preferably a monomer represented by $CF_2=CF$—ORf$^1$ (in which Rf$^1$ represents a $C_1$-$C_8$ perfluoroalkyl group). Examples of the PAVE include perfluoro (methylvinylether) (PMVE), perfluoro(ethylvinylether) (PEVE), perfluoro(propylvinylether) (PPVE), and perfluoro (butylvinylether). Among these, the PAVE is preferably at least one selected from the group consisting of PMVE, PEVE, and PPVE.

Rf$^5$ is single bond or a $C_1$-$C_5$ perfluoroalkylene group. The perfluoroalkylene group may be a linear chain or branched chain.

Examples of the monomer represented by the general formula: $CX^8X^9=CX^{10}Y$ include $CH_2=CHCF_2CF_2Br$ and $CF_2=CHBr$.

The TFE copolymer more preferably comprises the TFE unit, the unit derived from the monomer of the general formula: $CX^8X^9=CX^{10}Y$, and an other monomer unit derived from a other monomer copolymerizable with TFE and the monomer of the formula: $CX^8X^9=CX^{10}Y$.

The other monomer is not particularly limited as long as it is a monomer copolymerizable with TFE and the monomer of the formula: $CX^8X^9=CX^{10}Y$. Examples of the other monomer include ethylene (Et), a vinyl monomer represented by $CX^3X^4=CX^5(CF_2)_nX^6$ (in which $X^3$, $X^4$, and $X^5$ are the same as or different from one another and represent a hydrogen atom or a fluorine atom, $X^6$ is a hydrogen atom, a fluorine atom, or a chlorine atom, and n represents an integer of 1 to 10), and an alkyl perfluoro vinylether derivative represented by $CF_2=CF$—$OCH_2$—Rf$^2$ (in which Rf$^2$ represents a $C_1$-$C_5$ perfluoroalkyl group). Among these, the other monomer is preferably hexafluoropropylene (HFP).

Examples of the TFE copolymer include TFE/VdF/HFP/PPVE/$CH_2=CHCF_2CF_2Br$ copolymers and TFE/VdF/HFP/$CF_2=CHBr$ copolymers.

The amount of the TFE unit is preferably not smaller than 20 mol % and not larger than 95 mol % of all the monomer units, and is more preferably not smaller than 20 mol % and not larger than 90 mol % of all the monomer units, The amount of the monomer represented by the general formula: $CX^8X^9=CX^{10}Y$ is preferably not smaller than 5 mol % and not larger than 80 mol % of all the monomer units, and is more preferably not smaller than 5 mol % and not larger than 60 mol % of all the monomer units.

The amount of the other monomer unit is preferably not smaller than 0 mol % and not larger than 75 mol % of all the monomer units, and is more preferably not smaller than 5 mol % and not larger than 75 mol % of all the monomer units, The constitutional units may be quantified by $^{19}$F-NMR analyses.

The fluoropolymer such as CTFE copolymer may have at least one reactive functional group selected from the group consisting of carbonyl, hydroxy, heterocyclic, and amino groups, at a main chain terminal and/or at a side chain of the polymer.

In the present disclosure, "carbonyl group" is a divalent carbon group constituted by a carbon-oxygen double bond and is exemplified by a group represented by —C(=O)—. The reactive functional group such as the carbonyl group is not particularly limited, and examples thereof include a group containing a carbonyl group as a part of the chemical structure, such as a carbonate group, a carboxylic halide group (halogenoformyl group), a formyl group, a carboxyl group, an ester bond (—C(=O)—O—), an acid anhydride bond (—C(=O)—O—C(=O)—), an isocyanate group, an amide group, an imide group (—C(=O)—NH—C(=O)—), a urethane bond (—NH—C(=O)—O—), a carbamoyl group (NH$_2$—C(=O)—), a carbamoyloxy group (NH$_2$—C(=O)—O—), a ureide group (NH$_2$—C(=O)—NH—), and an oxamoyl group (NH$_2$—C(=O)—C(=O)—).

In a group such as an amide group, an imide group, a urethane bond, a carbamoyl group, a carbamoyloxy group, a ureide group, and an oxamoyl group, a hydrogen atom bonded to a nitrogen atom may be substituted by a hydrocarbon group such as an alkyl group.

Preferable examples of the reactive functional group include an amide group, a carbamoyl group, a hydroxy group, a carboxyl group, a carbonate group, a carboxylic halide group, and an acid anhydride bond, because they can be easily introduced and the fluoropolymer is allowed to have appropriate heat resistance and fine adhesiveness at a comparatively low temperature. Further, the reactive functional group is more preferably an amide group, a carbamoyl group, a hydroxy group, a carbonate group, a carboxylic halide group, or an acid anhydride bond.

Especially, one containing a carbonate group and/or a carboxylic halide group disclosed in WO 99/45044 A1 is particularly preferable. The content of WO 99/45044 A1 is hereby incorporated by reference in its entirety.

The fluoropolymer may be a polymer having a reactive functional group at either a main chain terminal or a side chain, or a polymer having a reactive functional group at both a main chain terminal and a side chain. In the case where the reactive functional group is at the main chain terminal, both terminals of the main chain may have the reactive functional groups or only one terminal may have the reactive functional group. In the case where the reactive functional group has an ether bond, the reactive functional group may be additionally contained in the main chain.

The fluoropolymer is preferably a polymer having a reactive functional group at a main chain terminal, because such a polymer does not significantly deteriorate the mechanical properties and chemical resistance or because it is advantageous in terms of productivity and cost.

The number of the reactive functional groups may be appropriately determined in accordance with the kind, shape, purpose of adhesion, application, required adhesiveness with the fluororubber layer to be laminated, and a method of adhering the fluororubber layer to the fluoropolymer layer.

The number of the reactive functional groups at a main chain terminal and/or at a side chain terminal is preferably 3 to 800 for each $1 \times 10^6$ of carbon atoms in the main chain. If the number is smaller than 3, the adhesiveness of the fluoropolymer layer with the fluororubber layer may be lowered. The lower limit is more preferably 15, still more preferably 30, and particularly preferably 120. The upper limit thereof is preferably 200, for example, in terms of productivity.

The number of the reactive functional groups at the terminal is obtained by the following procedure. The fluoropolymer in powder form is compression-formed at a forming temperature that is 50° C. higher than the melting point of the fluoropolymer and at a forming pressure of 5 MPa to give a film sheet having a thickness of 0.25 to 0.30 mm. The infrared absorption spectrum of the film sheet is obtained by using an infrared spectrophotometer. The obtained infrared absorption spectrum is compared with that of a known film so that the characteristic absorption of the reactive functional group is determined. The number of the reactive functional groups at the terminal can be calculated based on each difference spectrum using the following formula.

The number of terminal groups (for each $1 \times 10^6$ of carbon atoms)=(I×K)/t
I: absorption of light
K: correction factor
t: film thickness (mm)

Table 1 below shows the correction factors of the terminal reactive functional groups as targets.

TABLE 1

| Correction factors of terminal reactive functional groups | | |
|---|---|---|
| Terminal group | Absorption frequency (cm$^{-1}$) | Correction factor |
| —OC(=O)O—R | 1817 | 1426 |
| —COF | 1884 | 405 |
| —COOH | 1813, (1795-1792), 1775 | 455 |
| —COOCH$_3$ | 1795 | 355 |
| —CONH$_2$ | 3438 | 408 |
| —CH$_2$OH | 3648 | 2325 |

The correction factors shown in Table 1 above are determined based on the infrared absorption spectrum of a model compound for determining the number of terminal groups for each $1 \times 10^6$ of carbon atoms in the main chain.

A method for introducing the reactive functional group to the terminal of the main chain and/or the side chain may be a method in which a monomer (β) containing a reactive functional group is copolymerized and introduced, a method utilizing as a polymerization initiator a compound having or generating a reactive functional group, a method utilizing as a chain transfer agent a compound having or generating a reactive functional group, a method of introducing a reactive functional group to a fluoropolymer by a polymer reaction, and a method using these methods in combination.

The monomer (β) containing a reactive functional group in the case where a reactive functional group is introduced by copolymerization is not particularly limited, as long as it is a monomer copolymerizable with a monomer to be a part of a fluoropolymer and has the reactive functional group. Specifically, the following monomers may be exemplified.

First example of the monomer (β) is aliphatic unsaturated carboxylic acids disclosed in WO 2005/100420 A1, the content of which is hereby incorporated by reference in its entirety. The unsaturated carboxylic acids preferably contain at least one polymerizable carbon-carbon unsaturated bond in the molecule and at least one carbonyl oxy group (—C(=O)—O—) in the molecule.

The aliphatic unsaturated carboxylic acid may be an aliphatic unsaturated monocarboxylic acid or an aliphatic unsaturated polycarboxylic acid having two or more carboxyl groups. Examples thereof include C$_3$-C$_6$ unsaturated aliphatic monocarboxylic acids such as (meth)acrylic acids and crotonic acid.

Examples of the aliphatic unsaturated polycarboxylic acids include C$_3$-C$_6$ unsaturated aliphatic polycarboxylic acids such as maleic acid, fumaric acid, itaconic acid, citraconic acid, measaconic acid, aconitic acid, maleic anhydride, itaconic anhydride, and citraconic anhydride.

Second example of the monomer (β) is an unsaturated compound represented by the formula:

$$CX^7{}_2=CY^1—(Rf^4)_n—Z^1$$

(in the formula, $Z^1$ represents the reactive functional group, $X^7$ and $Y^1$ are the same as or different from each other and each represents a hydrogen atom or a fluorine atom, $Rf^4$ represents a C$_1$-C$_{40}$ alkylene group, C$_1$-C$_{40}$ fluorooxyalkylene group, C$_2$-C$_{40}$ fluoroalkylene group having an ether bond, or C$_2$-C$_{40}$ fluorooxyalkylene group having an ether bond, and n represents 0 or 1).

The amount of the reactive functional group-containing monomer (β) to be introduced by copolymerization is preferably not smaller than 0.05 mol %, and more preferably not smaller than 0.1 mol %, relative to the monomers constituting the entire fluoropolymer. If the amount is too large, gelation may easily occur during melting by heating. Therefore, the upper limit of the amount is preferably 5 mol %, and more preferably 3 mol %, relative to the monomers constituting the entire fluoropolymer.

The fluoropolymer may have a heterocyclic group or an amino group at a main chain terminal or at a side chain terminal of the polymer.

The heterocyclic group is a group having a hetero atom (e.g., a nitrogen atom, a sulfur atom, an oxygen atom) in a ring of the heterocyclic moiety. The ring may be a saturated ring or an unsaturated ring, and may be a monocycle ring or a fused ring. Especially, the heterocyclic group is preferably an oxazolyl group.

The amino group is a monovalent functional group obtained by removing hydrogen from ammonium, or a primary or secondary amine. Specifically, the amino group is represented by the formula:

—NR$^4$R$^5$ (in the formula, R$^4$ and R$^5$ are the same as or different from each other, and each represents a hydrogen atom or a C$_1$-C$_{20}$ monovalent organic group). Specific examples of the amino group include —NH$_2$, —NH(CH$_3$), —N(CH$_3$)$_2$, —NH(CH$_2$CH$_3$), —N(C$_2$H$_5$)$_2$, and —NH(C$_6$H$_5$).

The fluoropolymer is obtainable by a conventionally known polymerization method such as suspension polymerization, solution polymerization, emulsion polymerization, and bulk polymerization. In the polymerization, various conditions such as temperature and pressure, and the polymerization initiator and other additives may be appropriately determined in accordance with the composition or the amount of the fluoropolymer.

Examples of the polymerization initiator include: oil-soluble radical polymerization initiators represented by peroxy carbonates such as diisopropyl peroxydicarbonate (IPP) and di-n-propyl peroxydicarbonate (NPP); and water-soluble radical polymerization initiators such as ammonium, potassium, or sodium salts of persulfuric acid, perboric acid, perchloric acid, perphosphoric acid, and percarbonate. In particular, di-n-propyl peroxydicarbonate (NPP) is preferable.

a. Preparation of Fluoropolymer Layer (B)

The fluoropolymer of the present disclosure is obtainable by a conventionally known polymerization method such as suspension polymerization, solution polymerization, emulsion polymerization, and bulk polymerization. In the polymerization, various conditions such as temperature and pressure, and the amounts and types of polymerization initiators and other additives, may be appropriately determined in accordance with the makeup and the amount of the fluoropolymer.

b. Properties of Fluoropolymer Layer (B)

The melting point of the fluoropolymer such as the CTFE copolymer is not particularly limited, and is preferably 160° C. to 270° C. The melting point of the fluoropolymer is obtained as a temperature corresponding to the maximum value in the melting heat curve measured at a temperature rise of 10° C./min using a differential scanning calorimetry (DSC) device (e.g., manufactured by Seiko Instruments Inc.). The melt flow rate (MFR) is obtained by measuring the weight (g) of the polymer exiting a nozzle having a diameter of 2 mm and a length of 8 mm in a unit time (10 minutes) under a load of 5 kg at various temperatures with the use of a melt indexer (e.g., manufactured by Toyo Seiki Seisaku-sho, Ltd.).

The molecular weight of the fluoropolymer such as the CTFE copolymer is preferably within a range that allows the molded products obtained to have fine mechanical properties and low fuel permeability. For example, when the MFR is set as an index of the molecular weight, the MFR is preferably 0.5 to 100 g/10 min at an optional temperature within a range of about 230° C. to 350° C., which is a common temperature range for forming fluoropolymers.

The fluoropolymer layer (B) of the present disclosure may contain one of the fluoropolymers above or two or more of those fluoropolymers.

When the laminate of the present disclosure is used as a material for the fuel field, the fluoropolymer layer (B) in the laminate preferably has a fuel permeability coefficient of 10 g mm/m²/day or less, more preferably 1.0 g mm/m²/day or less, and still more preferably 0.5 g mm/m²/day or less. The fuel permeability coefficient is obtained by the following procedure. A sheet having a thickness of 1 mm and an area of 1 m², and made of a resin to be measured, is placed in a cup for the fuel permeability coefficient measurement containing a mixed solvent of isooctane:toluene:ethanol=45:45:10 (volume ratio). The mass change is then measured at 60° C. over a period of one day. Based on the measured value, the fuel permeability coefficient is calculated.

When the fluoropolymer is a perhalopolymer, it has particularly excellent chemical resistance and low fuel permeability. A perhalopolymer is a polymer in which halogen atoms are bonded to all the carbon atoms constituting the main chain of the polymer.

In accordance with the purposes and needs of individual applications, the fluoropolymer layer (B) may further contain various fillers such as inorganic powder, glass fibers, carbon powder, carbon fibers, and metal oxides, so long as they do not impair performance.

For example, for further lowering the fuel permeability, the fluoropolymer layer (B) may contain smectite layered clay minerals, such as montmorillonite, beidellite, saponite, nontronite, hectorite, sauconite, and stevensite, and/or fine layered minerals having high aspect ratios such as mica.

To impart conductivity to the fluoropolymer layer (B), a conductive filler may be added. The conductive filler is not particularly limited, and examples include a powdery or fibrous conductive elementary substance such as metals or carbons, powder of conductive compounds such as zinc oxide, and powder provided with electric conductivity by surface treatment. When a conductive filler is added, the fluoropolymer composition is preferably melted, compounded, and formed into a pellet in advance.

The powdery or fibrous conductive elementary substance is not particularly limited, and examples include: metal powders of copper and nickel; metal fibers of iron and stainless steel; and carbon black, carbon fibers, and carbon fibrils.

The powder provided with electric conductivity by surface treatment is a powder obtained by conducting treatment for imparting conductivity to the surface of a nonconductive powder such as glass beads and titanium oxide. The method for imparting conductivity to the surface is not particularly limited, and may be metal sputtering, electroless deposition, or the like.

Carbon black, among the conductive fillers, is favorably used because it is advantageous in terms of economic efficiency and prevention of static charge build-up.

The volume resistivity of the fluoropolymer composition containing a conductive filler is preferably $1 \times 10^0$ to $1 \times 10^9$ Ωcm. More preferably, the lower limit is $1 \times 10^2$ Ωcm and the upper limit is $1 \times 10^8$ Ωcm.

In addition to the fillers, optional additives such as heat stabilizers, stiffeners, UV absorbents, and pigments may be added.

III. Lamination

The laminate of the present disclosure is produced by laminating the fluororubber layer (A) and the fluoropolymer layer (B). In the laminate of the present disclosure, the fluororubber layers (A) may be laminated on both faces of the fluoropolymer layer (B). Or alternatively, the fluoropolymer layers (B) may be laminated on both faces of the fluororubber layer (A).

Lamination of the fluororubber layer (A) and the fluoropolymer layer (B) may be carried out by any method such as: a method of laminating the fluororubber layer (A) and the fluoropolymer layer (B), which have been separately formed, by pressure bonding and the like; a method of laminating the fluororubber layer (A) and the fluoropolymer layer (B) by simultaneously forming both layers; and a method of applying the fluoropolymer layer (B) composition to the fluororubber layer (A).

In the method of laminating the fluororubber layer (A) and the fluoropolymer layer (B), which have been separately formed, by pressure bonding and the like, different methods may be employed to form the respective layers of the fluoropolymer and of the fluororubber composition for curing.

Formation of the fluororubber layer (A) may be carried out by shaping the fluororubber composition for curing into various shapes such as a sheet and a tube by heat compression molding, transfer molding, extrusion, injection, calendering, coating, and the like.

The fluoropolymer layer (B) may be formed by heat compression molding, melt extrusion, injection, coating (including powder coating), or the like. Forming may be carried out by using a common forming machine for fluoropolymers such as an injection machine, a blow molding machine, an extrusion machine, and various coating machines. With such a machine, it is possible to produce laminates having various shapes such as a sheet and a tube. Among these methods, melt extrusion is preferable because of its excellent productivity.

As described further below, when another polymer layer (C) is laminated on the fluororubber layer (A) or the fluoropolymer layer (B), a forming method such as multilayer extrusion, multilayer blow molding, and multilayer injection may be employed to produce multilayer molded products such as multilayer tubes, multilayer hoses, and multilayer tanks.

Examples of the method of laminating the fluororubber layer (A) and the fluoropolymer layer (B) by simultaneously forming both layers include a method of performing forming and laminating at the same time with the use of the fluororubber composition for curing for forming the fluororubber layer (A) and the fluoropolymer for forming the fluoropolymer layer (B) by a method such as multilayer compression molding, multilayer transfer molding, multilayer extrusion, multilayer injection, or doubling. In such a method, the fluororubber layer (A) as an uncured formed body and the fluoropolymer layer (B) are laminated. Then, a treatment for firmly adhering the fluororubber layer (A) and the fluoropolymer layer (B) is not needed, and strong adhesion is advantageously obtained in the subsequent curing step.

The laminate of the present disclosure may be a laminate of the uncured fluororubber layer (A) and the fluoropolymer layer (B). Curing of such an uncured laminate gives strong interlayer adhesiveness.

Namely, the present disclosure also relates to a cured laminate in which a fluororubber layer (A1) and the fluoropolymer layer (B) are adhered to each other by curing, which is obtained by curing the uncured laminate of the present disclosure.

IV. Curing

A conventionally known method and conditions may be employed for curing a fluororubber composition for curing. The curing can be performed by heating the fluororubber composition. Exemplary methods include a method of curing an uncured laminate over a long period of time and a method in which an uncured laminate is first subjected to a heat treatment as a pretreatment for a comparatively short time (curing being initiated during the pretreatment) and next to a curing treatment over a long period of time. Especially, the method in which an uncured laminate is first subjected to a heat treatment as a pretreatment for a comparatively short time and next to a curing treatment over a long period of time is preferable for the following reasons. Namely, adhesion between the fluororubber layer (A) and the fluoropolymer layer (B) is easily obtained in the pretreatment. Further, since curing of the fluororubber layer (A) starts during the pretreatment and its shape is stabilized, the laminate may be held in various ways during the subsequent curing treatment.

Conditions of the curing treatment are not particularly limited, and common conditions may be employed.

Preferably, curing is performed at 130° C. to 260° C. for 5 minutes to 80 hours by using steam, pressing, an oven, an air bath, infrared rays, microwave, lead sheathing curing, and the like. More preferably, curing is performed at 150° C. to 230° C. for 8 minutes to 10 hours. Still more preferably, curing is performed at 160° C. to 230° C. for 8 minutes to 10 hours. When the pretreatment and the curing treatment after the pretreatment are performed for curing, the curing temperature is for the pretreatment and the curing treatment after the pretreatment. When the pretreatment and the curing treatment after the pretreatment are conducted for curing, the curing time is the total time for the pretreatment and the curing treatment after the pretreatment.

The optimal curing time ($T_{90}$, which is the time it takes to achieve 90% curing) of the fluororubber composition for curing is preferably not longer than 18 minutes. The optimal curing time ($T_{90}$) is more preferably not longer than 15 minutes, still more preferably not longer than 13 minutes, and particularly preferably not longer than 11 minutes. The lower limit of $T_{90}$ is not particularly limited, and may be not shorter than one minute, for example. The fluororubber composition for curing having a composition as described above can shorten the curing time and improve productivity. $T_{90}$ is a value obtained by measuring the maximum torque value ($M_H$) and the minimum torque value ($M_L$) at 160° C. and using the formula $\{(M_H)-(M_L)\}\times 0.9+M_L$. Here, $M_H$ and $M_L$ are measured in accordance with JIS K 6300-2.

Also, heating conditions during pretreatment are not particularly limited. Preferably, pretreatment is performed at 100° C. to 170° C. for 30 seconds to 1 hour by using steam, pressing, an oven, an air bath, infrared rays, microwave, lead sheathing curing, and the like. When the pretreatment is performed under relatively low temperature, the appropriate degree of curing can be obtained so that the processing such as bending after pretreatment becomes easy while avoiding the delamination.

Also, heating conditions during curing treatment after the pretreatment are not particularly limited. Preferably, curing treatment after the pretreatment is performed at more than 170° C. and not more than 260° C. for 30 seconds to 80 hours by using steam, pressing, an oven, an air bath, infrared rays, microwave, lead sheathing curing, and the like. When the curing treatment is performed under relatively high temperature, the sufficient degree of curing can be obtained and the sufficient mechanical strength of the laminate can be obtained.

In the cured laminate obtained, the cured fluororubber layer (A1) and the fluoropolymer layer (B) are adhered to each other by curing, and the interlayer adhesion between them is strong.

The laminates of the present disclosure (both the uncured laminate and the cured laminate) each may have a two-layer structure having a fluororubber layer (A or A1; hereinafter represented by fluororubber layer (A)) and a fluoropolymer layer (B), or a three-layer structure having layers of (A)-(B)-(A) or (B)-(A)-(B). Moreover, it may have a multilayer structure having three or more layers in which a polymer layer (C) other than the fluororubber layer (A) and the fluoropolymer layer (B) is adhered to the other layers.

The polymer layer (C) may be a rubber layer (C1) other than the fluororubber layer (A), a resin layer (C2) other than the fluoropolymer layer (B), or a fiber-reinforcement layer. In addition, the fluororubber layer (A) and/or the fluoropolymer layer (B) may be further laminated by interposing the polymer layer (C).

The rubber layer (C1) is made of a rubber other than the fluororubber used in the fluororubber layer (A) that is directly adhered to the fluoropolymer layer (B), and the rubber may be a fluororubber or a fluorine-free rubber. Specifically, the previously mentioned examples of uncured rubber may be used. Examples of fluorine-free rubber include: diene rubbers such as acrylonitrile-butadiene rubber (NBR) and its hydride (HNBR), styrene-butadiene rubber (SBR), chloroprene rubber (CR), butadiene rubber (BR), natural rubber (NR), isoprene rubber (IR), and ethylene-propylene-diene-monomer (EPDM) rubber; ethylene-propylene-termonomer copolymer rubber; silicone rubber; butyl rubber; epichlorohydrin rubber; and acrylic rubbers.

Here, a curing agent or other compounding agents may be added also to the uncured rubber composition for forming the rubber layer (C1).

The resin layer (C2) may be made of a resin having excellent mechanical strength or a resin having low permeability to fuels and gas. Examples of a resin having excellent mechanical strength include fluoropolymers (other than the fluoropolymer of the fluoropolymer layer (B)), polyamide resins, polyolefin resins, vinyl chloride resins, polyurethane resins, polyester resins, polyaramide resins, polyimide resins, polyamideimide resins, polyphenylene oxide resins, polyacetal resins, polycarbonate resins, acrylic resins, styrene resins, acrylonitrile/butadiene/styrene resins (ABS), cellulose resins, polyetheretherketone resins (PEEK), polysulfone resins, polyethersulfone resins (PES), and polyetherimide resins. Examples of a resin having low permeability to fuels and gas include resins containing ethylene/vinyl alcohol copolymers, polyphenylene sulfide resins, polybutylene naphthalate resins, polybutylene terephthalate resins, and polyphthalamide (PPA). Among these, polyamide resins are preferable because of their fine formability and adhesiveness. When a laminate is subjected to a curing treatment, the melting point of the resin is preferably higher than the temperature of the heat treatment.

Next, the layer structure of the laminate of the present disclosure is described.

(1) A Two-Layer Structure of Fluororubber Layer (A)-Fluoropolymer Layer (B)

This structure is the basic structure, and may have a layer pattern of (A)-(B) or (B)-(A). As described above, interlayer adhesion (fluoropolymer layer-fluororubber layer) in such a structure has been conventionally insufficient. Therefore, additional steps such as surface treatment on the fluoropolymer side, additional application of an adhesive between the layers, and fixation by winding a film in a tape form have been conventionally employed, and this has made the procedure complicated. However, according to the present disclosure, adhesion by curing provides strong adhesion.

As a laminate hose, for example, the thickness of the fluororubber layer (A) is preferably 0.2 mm or more and 6 mm or less, more preferably 0.3 mm or more and 4 mm or less, and still more preferably 0.3 mm or more and 3 mm or less, and the thickness of the fluoropolymer layer (B) is preferably 0.01 mm or more and 1 mm or less, more preferably 0.05 mm or more and 0.5 mm or less, and still more preferably 0.07 mm or more and 0.35 mm or less.

(2) A Three-Layer Structure in which the Innermost Layer is Fluororubber Layer (A)

This structure may have a layer pattern of (A)-(A)-(B), (A)-(B)-(A), (A)-(B)-(B), (A)-(B)-(C1), or (A)-(B)-(C2). When sealability is needed, rubber layers are preferably arranged on both sides of the fluoropolymer layer (B), for example, at a joint part of a fuel pipe or the like for maintaining sealability. The rubber layers of the outer and inner layers may be the same as or different from each other.

A fuel pipe can be endowed with enhanced chemical resistance and lower fuel permeability by employing the (A)-(B)-(C1) structure in which the fluororubber layer (A) is a fluororubber layer, the rubber layer (C1) is a fluorine-free rubber layer, and the fluororubber layer (A) is an inner layer of the pipe. As a laminate hose in this case, for example: the thickness of the fluororubber layer (A) is preferably 0.2 mm or more and 6 mm or less, more preferably 0.3 mm or more and 4 mm or less, and still more preferably 0.3 mm or more and 3 mm or less; the thickness of the fluoropolymer layer (B) is preferably 0.01 mm or more and 1 mm or less, more preferably 0.05 mm or more and 0.5 mm or less, and still more preferably 0.07 mm or more and 0.35 mm or less; the thickness of the rubber layer (C1) is preferably 0.2 mm or more and 6 mm or less, more preferably 0.3 mm or more and 4 mm or less, and still more preferably 0.4 mm or more and 3 mm or less; and the thickness of the resin layer (C2) is preferably 0.01 mm or more and 3 mm or less, more preferably 0.05 mm or more and 2 mm or less, and still more preferably 0.07 mm or more and 1 mm or less (3) A Three-Layer Structure in which the Innermost Layer is Fluoropolymer Layer (B)

This structure may have a layer pattern of (B)-(A)-(A), (B)-(A)-(B), (B)-(A)-(C1), (B)-(A)-(C2), or (B)-(B)-(A). The resin layers of the outer and inner layers may be the same as or different from each other.

The resin layers arranged on both sides of the fluororubber layer (A) stabilize the shape. In addition, such a structure is favorable when chemical resistance is important. Moreover, when different mechanical properties are required on the respective sides, the structure may have layers of (B)-(A)-(C2). As a laminate hose in this case, for example: the thickness of the fluororubber layer (A) is preferably 0.2 mm or more and 6 mm or less, more preferably 0.3 mm or more and 4 mm or less, and still more preferably 0.3 mm or more and 3 mm or less; the thickness of the fluoropolymer layer (B) is preferably 0.01 mm or more and 1 mm or less, more preferably 0.05 mm or more and 0.5 mm or less, and still more preferably 0.07 mm or more and 0.35 mm or less; the thickness of the rubber layer (C1) is preferably 0.2 mm or more and 6 mm or less, more preferably 0.3 mm or more and 4 mm or less, and still more preferably 0.4 mm or more and 3 mm or less; and the thickness of the resin layer (C2) is preferably 0.01 mm or more and 3 mm or less, more preferably 0.05 mm or more and 2 mm or less, and still more preferably 0.07 mm or more and 1 mm or less.

(4) A Three-Layer Structure in which the Innermost Layer is Rubber Layer (C1)

This structure may have a layer pattern of (C1)-(A)-(B) or (C1)-(B)-(A).

As a laminate hose in this case, for example: the thickness of the fluororubber layer (A) is preferably 0.2 mm or more and 6 mm or less, more preferably 0.3 mm or more and 4 mm or less, and still more preferably 0.3 mm or more and 3 mm or less; the thickness of the fluoropolymer layer (B) is preferably 0.01 mm or more and 1 mm or less, more preferably 0.05 mm or more and 0.5 mm or less, and still more preferably 0.07 mm or more and 0.35 mm or less; and the thickness of the rubber layer (C1) is preferably 0.2 mm or more and 6 mm or less, more preferably 0.3 mm or more and 4 mm or less, and still more preferably 0.4 mm or more and 3 mm or less.

(5) A Three-Layer Structure in which the Innermost Layer is Resin Layer (C2)

This structure may have a layer pattern of (C2)-(A)-(B) or (C2)-(B)-(A).

As a laminate hose in this case, for example: the thickness of the fluororubber layer (A) is preferably 0.2 mm or more and 6 mm or less, more preferably 0.3 mm or more and 4 mm or less, and still more preferably 0.3 mm or more and 3 mm or less; the thickness of the fluoropolymer layer (B) is preferably 0.01 mm or more and 1 mm or less, more preferably 0.05 mm or more and 0.5 mm or less, and still more preferably 0.07 mm or more and 0.35 mm or less; and the thickness of the resin layer (C2) is preferably 0.01 mm or more and 3 mm or less, more preferably 0.05 mm or more and 2 mm or less, and still more preferably 0.07 mm or more and 1 mm or less.

(6) A Four-or-More-Layer Structure

Onto the three-layer structures of (2) to (5) above, an optional rubber layer (A) or (C1), or an optional resin layer (B) or (C2), may be laminated in accordance with the purposes and needs of individual applications. Further, a layer of a metal foil and the like may be laminated, and an adhesive layer may be interposed between the layers except for the fluororubber layer (A)-fluoropolymer layer (B) part. As a laminate hose, for example: the thickness of the fluororubber layer (A) is preferably 0.2 mm or more and 6 mm or less, more preferably 0.3 mm or more and 4 mm or less, and still more preferably 0.3 mm or more and 3 mm or less; the thickness of the fluoropolymer layer (B) is preferably 0.01 mm or more and 1 mm or less, more preferably 0.05 mm or more and 0.5 mm or less, and still more preferably 0.07 mm or more and 0.35 mm or less; the thickness of the rubber layer (C1) is preferably 0.2 mm or more and 6 mm or less, more preferably 0.3 mm or more and 4 mm or less, and still more preferably 0.4 mm or more and 3 mm or less; and the thickness of the resin layer (C2) is preferably 0.01 mm or more and 3 mm or less, more preferably 0.05 mm or more and 2 mm or less, and still more preferably 0.07 mm or more and 1 mm or less.

Moreover, a polymer layer (C) may be further laminated to allow a laminate to be a lining.

In individual applications, the thickness, the shape, and the like of each layer may be appropriately determined in accordance with purposes and usage patterns.

The laminate of the present disclosure, especially a cured laminate, has sufficiently low fuel permeability and has excellent thermal resistance, oil resistance, fuel resistance, long-life coolant (LLC) resistance, and steam resistance. Additionally, such a laminate can withstand applications under severe conditions so as to be applicable in various usages.

For example, the laminate of the present disclosure is favorably used for seals, bellows, diaphragms, hoses, tubes, and electric cables of gaskets and non-contact- and contact-type packings (self-seal packing, piston ring, split ring packing, mechanical seal, oil seal, etc.), which are required to have thermal resistance, oil resistance, fuel resistance, LLC resistance, and steam resistance. They are used for: engine body, main engine-driving system, valve gear system, lubricating/cooling system, fuel system, and intake/exhaust system; transmission system of driving gear system; steering system of chassis; braking system; and standard electrical parts, electrical parts for control, and accessory electrical parts for automobiles.

Specifically, the laminate of the present disclosure is usable in the following applications.

In a basic engine: gaskets such as cylinder head gasket, cylinder head covering gaskets, oil pan packing, and general gaskets; seals such as O-rings, packing, and timing belt covering gaskets; hoses such as control hoses; and engine mount rubber cushions, and sealing materials for high pressure valves in hydrogen storage systems.

In a main driving system: shaft seals such as crankshaft seal and camshaft seal.

In a valve train system: valve stem seals of engine valves.

In a lubrication/cooling system: engine oil cooler hoses, oil return hoses, and seal gaskets of engine oil coolers; water hoses around radiators; and vacuum pump oil hoses of the vacuum pumps.

In a fuel system: oil seals, diaphragms, and valves of the fuel pumps; fuel hoses such as filler (neck) hoses, fuel supply hoses, fuel return hoses, and vapor (evaporator) hoses; in-tank hoses, filler seals, tank packing, and in-tank fuel pump mounting of fuel tanks; tubes and connector O-rings of the fuel line tubes; injector cushion rings, injector sealer rings, injector 0-rings, pressure regulator diaphragms, and check valves of fuel injectors; needle valves, accelerating pump pistons, flange gaskets, and controlling hoses of carburetors; and valve sheets and diaphragms of combined air control (CAC).

In an intake/exhaust system: intake manifold packing and exhaust manifold packing of manifolds; diaphragms, control hoses, and emission control hoses of EGR (exhaust gas recirculation); diaphragms of BPT (back pressure transducer); anti-afterburn (AB) valve sheets of AB valves; throttle body packing of throttles; and turbo oil hoses (supply), turbo oil hoses (return), turbo air hoses, inter cooler hoses, and turbine shaft seals of turbo chargers.

In a transmission system: bearing seals, oil seals, O-rings, packing, and tor-con hoses related to transmissions system; and mission oil hoses, automatic transmission fluid (ATF) hoses, O-rings, and packing of AT (automatic transmission).

In a steering system: power steering oil hoses.

In a braking system: breather valves, vacuum valves, and diaphragm of master vacs, piston cups (rubber cups) of master cylinders, oil seals, O-rings, packing, brake fluid hoses, caliper seals, and boots.

Of basic electrical components: insulation bodies and sheaths of electric cables (harness), and tubes of harness exterior parts.

In control electrical components: covering materials for various sensor cables.

As equipment electrical components: O-rings, packing, cooler hoses of car air conditioners, and wiper blades of exterior equipment.

Suitable applications other than automotive applications include: packing, O-rings, hoses, other sealing materials, diaphragms, valves for achieving oil resistance, chemical resistance, thermal resistance, steam resistance, or weather resistance in transportation systems such as marine vessels and aircrafts; similar packing, O-rings, sealing materials, diaphragms, valves, hoses, rolls, tubes, chemical resistant coatings, and linings in chemical plants; similar packing, O-rings, hoses, sealing materials, belts, diaphragms, valves, rolls, and tubes in food plant equipment and food equipment (including household goods); similar packing, O-rings, hoses, sealing materials, diaphragms, valves, and tubes in nuclear plant equipment; and similar packing, O-rings, hoses, sealing materials, diaphragms, valves, rolls, tubes, linings, mandrels, electric cables, flexible joints, belts, rubber plates, weather strips, and roll blades in PPC copiers, in common industrial goods. For example, backup rubber materials of a PTFE diaphragm have been problematically worn out or torn during use because of their poor slippage. However, the laminate of the present disclosure can solve such a problem and is favorably used.

Conventional rubber sealing materials, when used as rubber sealing materials for food, problematically have aromatizing properties, and rubber chips may become immixed in food as well. However, the laminate of the present disclosure can solve such problems and is favorably used. A rubber material may problematically swell when used as a sealing material for piping that employs a solvent for rubber sealing materials for medical and chemical application. However, use of the laminate of the present disclosure in which rubber is coated with resin can solve such a problem. In common industrial fields, the laminate of the present disclosure is favorably used in rubber rolls, O-rings, packing, sealing materials, and the like, with the aim of enhancing strength, slippage, chemical resistance, and permeability of the rubber material. Especially, the laminate of the present disclosure is favorably used in packing of lithium ion battery as it can maintain chemical resistance and sealing property at the same time. Additionally, the laminate of the present disclosure is favorably used in applications requiring sliding property by low friction.

Fuel pipes made of the laminate of the present disclosure may be produced by a common method, and the method is not particularly limited. The fuel pipes of the present disclosure include a corrugate tube. Among these, a fuel pipe made of the laminate above is preferable in terms of thermal resistance and low fuel permeability.

Examples

The present disclosure is now described with reference to Examples and Comparative Examples, but is not limited only to the Examples provided.

The CTFE/TFE/PAVE copolymer used in both Examples and Comparative Examples had PPVE (perfluoro(propylvinylether)) as the PAVE monomer unit, a makeup of CTFE/TFE/PPVE=21.3/76.3/2.4 (in mol %), a melting point of 248° C., a melt flow rate (MFR) of 29.2 g/10 min, and a fuel permeability coefficient of 0.4 g mm/m²/day.

I. Fluororubber Compositions for Curing

Materials in proportions as shown in Tables 2 to 5 were compounded using an 8-inch open roll mixer to give fluororubber compositions for curing in a sheet shape having a thickness of about 2 mm for Comparative Examples 1 to 3 and Examples 1 to 13. Numerical values in Tables 2 to 5 are each expressed in units of "parts by mass," and "phr" in the Tables stands for "parts per hundred of rubber."

The optimal curing time ($T_{90}$, which is the time it takes to achieve 90% curing) was determined by measuring a maximum torque value ($M_H$) and a minimum torque value ($M_L$) at 170° C. or 150° C. using a moving die rheometer ("MDR") (manufactured by Alpha Technologies, MDR2000) for each of the fluororubber compositions for curing. $T_{10}$ refers to the time it takes to achieve 10% curing. Tables 2 to 5 show the measurements. $M_H$ and $M_L$ are measured in accordance with JIS K 6300-2.

A sheet (about 2 mm thick) of a fluororubber composition for curing shown in Tables 2 to 4 and a CTFE/TFE/PPVE copolymer sheet having a thickness of 120 μm were stacked with a fluoropolymer film (10 μm thick, product of Daikin Industries, Ltd., trade name: Polyflon™ PTFE M731 skive film) having a width of about 10 to 15 mm interposed between them on one end portion. In example 13 shown in Table 5, a TFE/HFP/VDF/PPVE copolymer (product of 3M Company, trade name: THV815) sheet having a thickness 200 μm was used instead of the CTFE/TFE/PPVE copolymer sheet. The stack was inserted into a die containing a metal spacer so as to make a sheet having a thickness of 2 mm, and was pressed at 170° C. for 30 minutes to give a sheet-shaped laminate. However, in Example 12 shown in Table 4, the pressing conditions were changed to 150° C. for 45 minutes. The laminate obtained was cut into three sets of strip specimens (10 mm width×40 mm length) each with a grip that was the part where the copolymer sheet would be peeled. The adhesion strength of the specimens was measured by performing a peeling test at a tensile speed of 50 mm/min at 25° C. using a tensile testing machine (manufactured by Shimadzu Corporation, AGS-J 5 kN) in accordance with the method disclosed in JIS-K-6256 (Adhesion test of cross-linked rubber). The average value of the data obtained (N=3) was calculated and determined as the adhesion strength. Further, the detachment was observed and evaluated based on the following criteria. Tables 2 to 5 show the results as well.

II. Evaluation of Adhesion

"Good" means that an adhesion strength of 5 N/cm or more was obtained between the fluororubber sheet and the copolymer sheet.

"Poor" means that an adhesion strength of less than 5 N/cm was obtained between the fluororubber sheet and the copolymer sheet.

III. Measurement of Conductivity

For Example 9, a fluororubber sheet having a size of 15 cm×15 cm×2 mm was prepared through curing and molding. By using Analog Insulation Resistance Tester 24060 (manufactured by Yokogawa Electric Corporation), probe terminals were contacted at both ends of the fluororubber sheet, and the insulation resistance value was measured when a voltage of 500 V was applied. As a result, the conductivity of the fluororubber sheet of Example 9 was measured to be 0.7 MΩ.

TABLE 2

| | | | | Comparative Examples | | |
|---|---|---|---|---|---|---|
| Classification | Materials | Manufacturer | Units | Comparative Example 1 | Comparative Example 2 | Comparative Example 3 |
| Base polymer | Fluororubber (A) | Daikin Industries, Ltd. | phr | 100.0 | 100.0 | 100.0 |
| Carbon black | MT Carbon | Degussa-Huels | phr | 20.0 | 20.0 | 20.0 |
| | DENKA BLACK | Denka Compoany Limited | phr | | | |
| Co-curing Agent | TAIC | Nippon Kasei Chemical Co., Ltd | phr | 3.0 | 3.0 | 3.0 |
| Curing Agent | Perhexa 25B | NOF Corporation | phr | 1.5 | 1.5 | 1.5 |
| Basic Multifunctional Compound | V3 | Daikin Industries, Ltd. | phr | 3.0 | 3.0 | 3.0 |
| Silica | DM-20S | Tokuyama Corporation | phr | 20.0 | | |
| | PM-20 | Tokuyama Corporation | phr | | 20.0 | |
| | HG-09 | Tokuyama Corporation | phr | | | 20.0 |
| | SIDISTAR R300 | Elkem Japan K.K. | phr | | | |
| | SIDISTAR T120U | Elkem Japan K.K. | phr | | | |
| | SO-C6 | Admatechs Company Limited | phr | | | |
| | FEF75H | Admatechs Company Limited | phr | | | |
| PTFE powder | TF9205 | 3M | phr | | | |
| | L5F | Daikin Industries, Ltd. | phr | | | |
| Phosphine | Diphenylphosphinous Chloride | Tokyo Chemical Industry Co., Ltd. | phr | 0.25 | 0.25 | 0.25 |
| | Total | | | 147.75 | 147.75 | 147.75 |

TABLE 2-continued

| | | | | Comparative Examples | | |
|---|---|---|---|---|---|---|
| Classification | Materials | Manufacturer | Units | Comparative Example 1 | Comparative Example 2 | Comparative Example 3 |
| MDR 170° C. | ML | ML | dNm | 1 | 1 | 1 |
| | MH | MH | dNm | 48 | 39 | 57 |
| | T10 | | min | 1 | 1 | 1 |
| | T90 | | min | 4 | 4 | 5 |
| | Adhesion Strength (170° C. × 30 min) | | N/cm | 1 | 2 | 1 |
| | Evaluation on Adhesion | | | Poor | Poor | Poor |

TABLE 3-1

| | | | | Examples | | | | | |
|---|---|---|---|---|---|---|---|---|---|
| Classification | Materials | Manufacturer | Units | Example 1 | Example 2 | Example 3 | Example 4 | Example 5 | Example 6 |
| Base polymer | Flurorubber (A) | Daikin Industries, Ltd. | phr | 100.0 | 100.0 | 100.0 | 100.0 | 100.0 | 100.0 |
| Carbon black | MT Carbon | Degussa-Huels | phr | 20.0 | 20.0 | 16.0 | 16.0 | 20.0 | 20.0 |
| | DENKA BLACK | Denka Compoany Limited | phr | | | | | | |
| Co-curing Agent | TAIC | Nippon Kasei Chemical Co., Ltd | phr | 3.0 | 3.0 | 3.0 | 3.0 | 3.0 | 3.0 |
| Curing Agent | Perhexa 25B | NOF Corporation | phr | 1.5 | 1.5 | 1.5 | 1.5 | 1.5 | 1.5 |
| Basic Multi-functional Compound | V3 | Daikin Industries, Ltd. | phr | 3.0 | 3.0 | 3.0 | 3.0 | 3.0 | 3.0 |
| Silica | DM-20S | Tokuyama Corporation | phr | | | | | | |
| | PM-20 | Tokuyama Corporation | phr | | | | | | |
| | HG-09 | Tokuyama Corporation | phr | | | | | | |
| | SIDISTAR R300 | Elkem Japan K.K. | phr | 20.0 | | 16.0 | 16.0 | 20.0 | 20.0 |
| | SIDISTAR T120U | Elkem Japan K.K. | phr | | 20.0 | | | | |
| | SO-C6 | Admatechs Company Limited | phr | | | | | | |
| | FEF75H | Admatechs Company Limited | phr | | | | | | |
| PTFE powder | TF9205 | 3M | phr | | | | | 20.0 | 30.0 | 30.0 |
| | L5F | Daikin Industries, Ltd. | phr | | | | 20.0 | | |
| Phosphine | Diphenylphosphinous Chloride | Tokyo Chemical Industry Co., Ltd. | phr | 0.25 | 0.25 | | | | 0.25 |
| | Total | | | 147.75 | 147.75 | 159.5 | 159.5 | 177.5 | 177.75 |
| MDR 170° C. | ML | | dNm | 1 | 1 | 1 | 1 | 1 | 1 |
| | MH | | dNm | 36 | 37 | 33 | 40 | 40 | 38 |
| | T10 | | min | 1 | 1 | 1 | 1 | 2 | 2 |
| | T90 | | min | 5 | 6 | 7 | 6 | 7 | 7 |
| | Adhesion Strength (170° C. × 30 min) | | N/cm | 10 | 13 | 24 | 14 | 15 | 17 |
| | Evaluation on Adhesion | | | Good | Good | Good | Good | Good | Good |

TABLE 3-2

| | | | | Examples | | | | |
|---|---|---|---|---|---|---|---|---|
| Classification | Materials | Manufacturer | Units | Example 7 | Example 8 | Example 9 | Example 10 | Example 11 |
| Base polymer | Flurorubber (A) | Daikin Industries, Ltd. | phr | 100.0 | 100.0 | 100.0 | 100.0 | 100.0 |
| Carbon black | MT Carbon | Degussa-Huels | phr | 20.0 | 20.0 | | 20.0 | 20.0 |
| | DENKA BLACK | Denka Compoany Limited | phr | | | 8.0 | | |
| Co-curing Agent | TAIC | Nippon Kasei Chemical Co., Ltd | phr | 3.0 | 3.0 | 3.0 | 3.0 | 3.0 |
| Curing Agent | Perhexa 25B | NOF Corporation | phr | 1.5 | 2.0 | 2.0 | 2.0 | 2.0 |
| Basic Multifunctional Compound | V3 | Daikin Industries, Ltd. | phr | 3.0 | 3.0 | 3.0 | 3.0 | 3.0 |
| Silica | DM-20S | Tokuyama Corporation | phr | | | | | |
| | PM-20 | Tokuyama Corporation | phr | | | | | |
| | HG-09 | Tokuyama Corporation | phr | | | | | |
| | SIDISTAR R300 | Elkem Japan K.K. | phr | 16.0 | 20.0 | 16.0 | | |
| | SIDISTAR T120U | Elkem Japan K.K. | phr | | | | | |
| | SO-C6 | Admatechs Company Limited | phr | | | | 20.0 | |
| | FEF75H | Admatechs Company Limited | phr | | | | | 20.0 |

TABLE 3-2-continued

| Classification | Materials | Manufacturer | Units | Example 7 | Example 8 | Example 9 | Example 10 | Example 11 |
|---|---|---|---|---|---|---|---|---|
| PTFE powder | TF9205 | 3M | phr | | | 20.0 | 30.0 | 30.0 |
| | L5F | Daikin Industries, Ltd. | phr | | | | | |
| Phosphine | Diphenylphosphinous Chloride | Tokyo Chemical Industry Co., Ltd. | phr | | | | | |
| | | Total | | 143.5 | 148.0 | 152.0 | 178.0 | 178.0 |
| MDR 170° C. | | ML | dNm | 1 | 1 | 1 | 1 | 1 |
| | | MH | dNm | 30 | 35 | 40 | 29 | 23 |
| | | T10 | min | 2 | 1 | 1 | 1 | 1 |
| | | T90 | min | 7 | 6 | 6 | 7 | 8 |
| | Adhesion Strength (170° C. × 30 min) | | N/cm | 9 | 10 | 10 | 16 | 8 |
| | Evaluation on Adhesion | | | Good | Good | Good | Good | Good |

TABLE 4

| Classfication | Materials | Manufacturer | Units | Example12 |
|---|---|---|---|---|
| Base polymer | Flurorubber (A) | Daikin Industries, Ltd. | phr | 100.0 |
| Carbon black | MT Carbon | Degussa-Huels | phr | 20.0 |
| | DENKA BLACK | Denka Compoany Limited | phr | |
| Co-curing Agent | TAIC | Nippon Kasei Chemical Co., Ltd | phr | 6.0 |
| Curing Agent | Perhexa 25B | NOF Corporation | phr | 4.0 |
| Basic Multifunctional Compound | V3 | Daikin Industries, Ltd. | phr | 3.0 |
| Silica | DM-20S | Tokuyama Corporation | phr | |
| | PM-20 | Tokuyama Corporation | phr | |
| | HG-09 | Tokuyama Corporation | phr | |
| | SIDISTAR R300 | Elkem Japan K. K. | phr | 20.0 |
| | SIDISTAR T120U | Elkem Japan K. K. | phr | |
| | SO-C6 | Admatechs Company Limited | phr | |
| | FEF75H | Admatechs Company Limited | phr | |
| PTFE powder | TF9205 | 3M | phr | 30.0 |
| | L5F | Daikin Industries, Ltd. | phr | |
| Phosphine | Diphenylphosphinous Chloride | Tokyo Chemical Industry Co., Ltd. | phr | |
| | | Total | | 183.0 |
| MDR 150° C. | | ML | dNm | 1 |
| | | MEI | dNm | 39 |
| | | T10 | min | 5 |
| | | T90 | min | 18 |
| | Adhesion Strength (150° C. × 45 min) | | N/cm | 18 |
| | Evaluation on Adhesion | | | Good |

TABLE 5

| Classfication | Materials | Manufacturer | Units | Example 13 |
|---|---|---|---|---|
| Base polymer | Flurorubber (A) | Daikin Industries, Ltd. | phr | 100.0 |
| Carbon black | MT Carbon | Degussa-Huels | phr | 20.0 |
| | DENKA BLACK | Denka Compoany Limited | phr | |
| Co-curing Agent | TAIC | Nippon Kasei Chemical Co., Ltd | phr | 3.0 |
| Curing Agent | Perhexa 25B | NOF Corporation | phr | 1.5 |
| Basic Multifunctional Compound | V3 | Daikin Industries, Ltd. | phr | 3.0 |
| Silica | DM-20S | Tokuyama Corporation | phr | |
| | PM-20 | Tokuyama Corporation | phr | |
| | HG-09 | Tokuyama Corporation | phr | |
| | SIDISTAR R300 | Elkem Japan K. K. | phr | 20.0 |
| | SIDISTAR T120U | Elkem Japan K. K. | phr | |
| | SO-C6 | Admatechs Company Limited | phr | |
| | FEF75H | Admatechs Company Limited | phr | |

TABLE 5-continued

| Classfication | Materials | Manufacturer | Units | Example 13 |
|---|---|---|---|---|
| PTFE powder | TF9205 | 3M | phr | 30.0 |
| | L5F | Daikin Industries, Ltd. | phr | |
| Phosphine | Diphenylphosphinous Chloride | Tokyo Chemical Industry Co., Ltd. | phr | |
| | Total | | | 177.5 |
| MDR 170° C. | | ML | dNm | 1 |
| | | MEI | dNm | 40 |
| | | T10 | min | 2 |
| | | T90 | min | 7 |
| | Adhesion Strength (170° C. × 30 min) | | N/cm | 8 |
| | Evaluation on Adhesion | | | Good |

The shorthand notations appearing under the column "Materials" in Tables 2 to 5 above are as follows.

Fluororubber (A) is a peroxide-cross-linkable, ternary fluororubber (VdF/HFP/TFE=50/30/20 (in mol %)), with a Mooney viscosity ($ML_{1+10}$, 100° C.) of 50.

MT Carbon is amorphous carbon black (CAS No. 1333-86-4).

DENKA BLACK is carbon black that exhibits high conductivity (CAS No. 1333-86-4).

TAIC™ has the following chemical formula (CAS No. 1025-15-6).

[chem. 2]

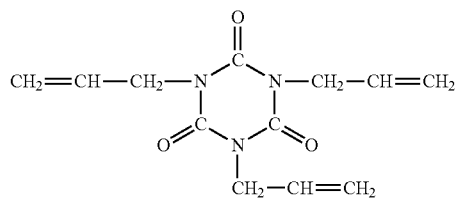

Perhexa (registered trademark) 25B refers to 2,5-dimethyl-2,5-di(t-butylperoxy)hexane (CAS No. 78-63-7), and is shown below.

[chem. 3]

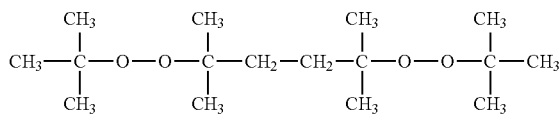

V3 refers to N,N'-dicinnamylidene-1,6-hexanediamine (CAS No. 140-73-8), and is shown below. In this molecule, the distance between the two nitrogen atoms is 8.80 Å.

[chem. 4]

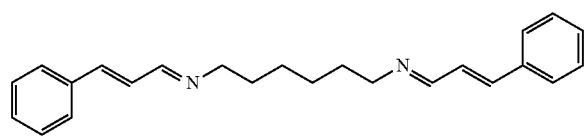

Diphenylphosphinous chloride (CAS No. 1079-66-9), also known as chlorodiphenylphosphine, has the following chemical formula.

[chem. 5]

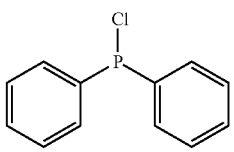

TF9205 and L5F both refer to powder of low molecular weight polytetrafluoroethylene (PTFE) (CAS No. 9002-84-0), of which TF9205 is low molecular weight PTFE powder that has been sintered at high temperature.

Finally, Table 6 below summarizes the average particle sizes, the average circularities, and the average values of the product "(particle size)×(circularity)" of the silica, as measured before being mixed into a fluororubber formulation, used in Comparative Examples 1 to 3 and in Examples 1 to 13. Further below, Table 7 then summarizes the apparent average particle sizes, the apparent average circularities, and the apparent average values of the product "(particle size)× (circularity)" of the silica, as measured after being incorporated into a fluororubber formulation and then cured, obtained for Comparative Example 2 (PM-20), Comparative Example 3 (HG-09), Example 1 (SIDISTAR (registered trademark) R300), Example 10 (SO-C6), and Example 11 (FEF75H). In obtaining the data tabulated, SEM photographs were taken by using Scanning Electron Microscope SU8020 (manufactured by Hitachi High-Technologies Corporation). The SEM photographs of the silica taken before being mixed into a fluororubber formulation are shown in FIG. 1 through FIG. 5, and an SEM photograph and images from the elemental-mapping analysis performed on Example 1 (containing SIDISTAR (registered trademark) R300, and after being incorporated into a fluororubber formulation and then cured) are shown in FIG. 6 through FIG. 8. Image processing and analyses were performed by using general-purpose image analysis software Win Roof (product of Mitani Corporation). For the SEM-EDX (Energy Dispersive X-ray) measurements of FIG. 6 and FIG. 7, the accelerating voltage of the electron beam was 5 kV, and the working distance (i.e., the distance between the objective lens and sample surface) was 12.6 mm.

TABLE 6

Average particle size, average circularity, and average value of the product "(particle size) × (circularity)," as measured before being mixed into a fluororubber formulation, of silica used in Comparative Examples 1 to 3 and in Examples 1 to 13

| Silica | Manufacturer | Average particle size | Average circularity | Average value of the product "(particle size) × (circularity)" |
|---|---|---|---|---|
| DM-20S | Tokuyama Corporation | 22.6 nm | 0.77 | 17.3 nm |
| PM-20 | Tokuyama Corporation | 21.2 nm | 0.78 | 16.4 nm |
| HG-09 | Tokuyama Corporation | 18.5 nm | 0.76 | 13.9 nm |
| R300 | Elkem Japan K. K. | 83.4 nm | 0.88 | 74.4 nm |
| T120U | Elkem Japan K. K. | 83.8 nm | 0.87 | 73.3 nm |
| SO-C6 | Admatechs Company Limited | 2.9 μm | 0.85 | 2.4 μm |
| FEF75H | Admatechs Company Limited | 8.4 μm | 0.84 | 7.1 μm |

TABLE 7

Apparent average particle size, apparent average circularity, and apparent average value of the product "(particle size) × (circularity)," as measured after being incorporated into a fluororubber formulation and then cured, of silica obtained for Comparative Example 2 (PM-20), Comparative Example 3 (HG-09), Example 1 (SIDISTAR (registered trademark) R300), Example 10 (SO-C6), and Example 11 (FEF75H)

| Silica | Manufacturer | Apparent Average particle size | Apparent Average circularity | Apparent average value of the product "(particle size) × (circularity)" |
|---|---|---|---|---|
| PM-20 | Tokuyama Corporation | 32.9 nm | 0.71 | 23.7 nm |
| HG-09 | Tokuyama Corporation | 37.7 nm | 0.79 | 30.5 nm |
| R300 | Elkem Japan K. K. | 232.6 nm | 0.73 | 172.8 nm |
| SO-C6 | Admatechs Company Limited | 2.2 μm | 0.61 | 1.3 μm |
| FEF75H | Admatechs Company Limited | 22.5 μm | 0.66 | 15.3 μm |

Another different characteristic between SIDISTAR (registered trademark) R300 and SIDISTAR (registered trademark) T120U besides those shown in Table 6 above is that since SIDISTAR (registered trademark) T120U has a shorter aggregation time and a lower bulk density than does SIDISTAR (registered trademark) R300, SIDISTAR (registered trademark) T120U is more easily dispersed than SIDISTAR (registered trademark) R300. Accordingly, for example, SIDISTAR (registered trademark) R300 is recommended for use with rubbers, whereas SIDISTAR (registered trademark) T120U is recommended for use with plastics.

Now that exemplary embodiments of the present disclosure have been shown and described in detail, various modifications and improvements of them will become readily apparent to those skilled in the art.

It will be understood that one or more of the elements or exemplary embodiments described can be rearranged, separated, or combined without deviating from the scope of the present disclosure. For ease of description, various elements are, at times, presented separately. This is merely for convenience and is in no way meant to be a limitation.

Further, it will be understood that one or more of the steps described can be rearranged, separated, or combined without deviating from the scope of the present disclosure. For ease of description, steps are, at times, presented sequentially. This is merely for convenience and is in no way meant to be a limitation.

While the various elements, steps, and exemplary embodiments of the present disclosure have been outlined above, it is evident that many alternatives, modifications, and variations will be apparent to those skilled in the art. The various elements, steps, and exemplary embodiments of the present disclosure, as described above, are intended to be illustrative, not limiting. Various changes can be made without departing from the spirit and scope of the present disclosure. Accordingly, the spirit and scope of the present disclosure is to be construed broadly and not limited by the foregoing description.

No element, act, or instruction used in the description of the present disclosure should be construed as critical or essential unless explicitly described as such. Also, as used herein, the article "a" is intended to include one or more items. Where only one item is intended, the term "one," "single," or similar language is used.

INDUSTRIAL APPLICABILITY

The present disclosure has industrial applicability in that it provides, among other things, laminates, especially cured laminates, that are favorably used for seals, bellows, diaphragms, hoses, tubes, and electric cables of gaskets and non-contact- and contact-type packings (self-seal packing, piston ring, split ring packing, mechanical seal, oil seal, etc.), which are required to have thermal resistance, oil resistance, fuel resistance, long-life coolant (LLC) resistance, and steam resistance. They are used for: engine bodies, main engine-driving systems, valve gear systems, lubricating/cooling systems, fuel systems, and intake/exhaust systems; transmission systems of driving gear systems; steering systems of chassis; braking systems; and standard electrical parts, electrical parts for control, and accessory electrical parts for automobiles.

The invention claimed is:
1. A laminate comprising:
a fluororubber layer (A); and
a fluoropolymer layer (B) on the fluororubber layer (A);

wherein:
  the fluororubber layer (A) is a layer made of a fluororubber composition for curing;
  the fluororubber composition for curing comprises an uncured fluororubber, silica particles, and a basic multifunctional compound;
  the silica particles have an average value of the product "(particle size)×(circularity)" that is 17.5 nm or higher and 500 μm or lower;
  the silica particles are contained in the fluororubber composition for curing in an amount of between 1 part by mass inclusive and 70 parts by mass inclusive for each 100 parts by mass of the uncured fluororubber;
  the fluoropolymer layer (B) is a layer made of a fluoropolymer composition; and
  the fluoropolymer composition comprises a fluoropolymer that is a chlorotrifluoroethylene copolymer or a tetrafluoroethylene copolymer comprising a tetrafluoroethylene unit and a unit derived from at least one monomer selected from the group consisting of perfluoro(alkylvinylether), vinylidene fluoride and a monomer represented by the general formula: $CX^8X^9=CX^{10}Y$, wherein $X^8$, $X^9$ and $X^{10}$ are independently F or H, Y is —Cl or —$Rf^5$—Br, $Rf^5$ is single bond or a $C_1$-$C_5$ perfluoroalkylene group.

2. The laminate according to claim 1, wherein the fluoropolymer is the chlorotrifluoroethylene copolymer or a tetrafluoroethylene copolymer comprising the tetrafluoroethylene unit, a vinylidene fluoride unit and a unit derived from the monomer represented by the general formula: $CX^8X^9=CX^{10}Y$.

3. The laminate according to claim 1, wherein the fluoropolymer is the chlorotrifluoroethylene copolymer.

4. The laminate according to claim 1, wherein the chlorotrifluoroethylene copolymer comprises a chlorotrifluoroethylene unit, a tetrafluoroethylene unit, and a perfluoro(alkylvinylether) unit.

5. The laminate according to claim 4, wherein the ratio between the chlorotrifluoroethylene unit and the tetrafluoroethylene unit in the chlorotrifluoroethylene copolymer is chlorotrifluoroethylene unit/tetrafluoroethylene unit=15-90/85-10 in mol %.

6. The laminate according to claim 4, wherein the amount of the perfluoro(alkylvinylether) unit in the chlorotrifluoroethylene copolymer is not smaller than 0.5 mol % and not larger than 5 mol % of all the monomer units.

7. The laminate according to claim 1, wherein the silica particles have an average particle size that is 25.0 nm or higher.

8. The laminate according to claim 1, wherein the silica particles have an average particle size that is 500 μm or lower.

9. The laminate according to claim 1, wherein the silica particles have an average circularity that is 0.80 or higher.

10. The laminate according to claim 1, wherein the fluororubber composition for curing further comprises low molecular weight polytetrafluoroethylene powder.

11. The laminate according to claim 1, wherein the fluororubber composition for curing further comprises a phosphorus compound represented by the general formula $PR_3$, wherein the three Rs may be the same as or different from one another, and each R represents a halogen atom or an organic group.

12. The laminate according to claim 1, wherein the fluororubber composition for curing further comprises a peroxide curing agent.

13. A laminate obtained by curing the laminate according to claim 1, wherein a cured fluororubber layer produced from the fluororubber layer (A) and the fluoropolymer layer (B) are adhered to each other by curing.

14. A tube or hose for transferring fuel, comprising the laminate according to claim 1.

15. A pipe for transferring fluid, comprising the laminate according to claim 1.

16. A laminate comprising:
  a cured fluororubber layer (A1); and
  a fluoropolymer layer (B) on the cured fluororubber layer (A1);
wherein:
  the cured fluororubber layer (A1) is a layer made of a cured fluororubber composition;
  the cured fluororubber composition comprises a cured fluororubber, silica particles, and a basic multifunctional compound;
  the silica particles have an apparent average value of the product "(particle size)×(circularity)" that is 32.0 nm or higher and 500 μm or lower;
  the silica particles are contained in the cured fluororubber composition in an amount of between 1 part by mass inclusive and 70 parts by mass inclusive for each 100 parts by mass of the fluororubber;
  the fluoropolymer layer (B) is a layer made of a fluoropolymer composition; and
  the fluoropolymer composition comprises a fluoropolymer that is a chlorotrifluoroethylene copolymer or a tetrafluoroethylene copolymer comprising a tetrafluoroethylene unit and a unit derived from at least one monomer selected from the group consisting of perfluoro(alkylvinylether), vinylidene fluoride and a monomer represented by the general formula: $CX^8X^9=CX^{10}Y$, wherein $X^8$, $X^9$ and $X^{10}$ are independently F or H, Y is —Cl or —$Rf^5$—Br, $Rf^5$ is single bond or a $C_1$-$C_5$ perfluoroalkylene group.

17. The laminate according to claim 16, wherein the fluoropolymer is the chlorotrifluoroethylene copolymer or a tetrafluoroethylene copolymer comprising the tetrafluoroethylene unit, a vinylidene fluoride unit and a unit derived from the monomer represented by the general formula: $CX^8X^9=CX^{10}Y$.

18. The laminate according to claim 16, wherein the fluoropolymer is the chlorotrifluoroethylene copolymer.

19. The laminate according to claim 16, wherein the chlorotrifluoroethylene copolymer comprises a chlorotrifluoroethylene unit, a tetrafluoroethylene unit, and a perfluoro(alkylvinylether) unit.

20. The laminate according to claim 19, wherein the ratio between the chlorotrifluoroethylene unit and the tetrafluoroethylene unit in the chlorotrifluoroethylene copolymer is chlorotrifluoroethylene unit/tetrafluoroethylene unit=15-90/85-10 in mol %.

21. The laminate according to claim 19, wherein the amount of the perfluoro(alkylvinylether) unit in the chlorotrifluoroethylene copolymer is not smaller than 0.5 mol % and not larger than 5 mol % of all the monomer units.

22. The laminate according to claim 16, wherein the silica particles have an apparent average particle size that is 40.0 nm or higher.

23. The laminate according to claim 16, wherein the silica particles have an apparent average particle size that is 500 μm or lower.

24. The laminate according to claim 16, wherein the cured fluororubber composition further comprises low molecular weight polytetrafluoroethylene powder.

25. The laminate according to claim 16, wherein the cured fluororubber composition further comprises a phosphorus compound represented by the general formula $PR_3$, wherein the three Rs may be the same as or different from one another, and each R represents a halogen atom or an organic group.

26. A tube or hose for transferring fuel, comprising the laminate according to claim 16.

27. A pipe for transferring fluid, comprising the laminate according to claim 16.

* * * * *